US010344245B2

(12) United States Patent
Moniz et al.

(10) Patent No.: US 10,344,245 B2
(45) Date of Patent: Jul. 9, 2019

(54) LUBRICATING OIL COMPOSITIONS COMPRISING A BIODIESEL FUEL AND A DISPERSANT

(71) Applicant: Chevron Oronite Technology B.V, San Ramon, CA (US)

(72) Inventors: Menno Anton Stefan Moniz, Rotterdam (NL); Walter Alexander Hartgers, Rotterdam (NL); Richard Hogendoorn, Rotterdam (NL)

(73) Assignee: Chevron Oronite Technology B.V., Rotterdam (NL)

( * ) Notice: Subject to any disclaimer, the term of this patent is extended or adjusted under 35 U.S.C. 154(b) by 312 days.

(21) Appl. No.: 15/333,436

(22) Filed: Oct. 25, 2016

(65) Prior Publication Data
US 2018/0112145 A1 Apr. 26, 2018

(51) Int. Cl.
| | | |
|---|---|---|
| *C10M 161/00* | (2006.01) | |
| *F01M 9/04* | (2006.01) | |
| *F02B 43/12* | (2006.01) | |
| *C08F 255/02* | (2006.01) | |
| *C10M 159/12* | (2006.01) | |
| *C10M 169/04* | (2006.01) | |
| *C08L 51/00* | (2006.01) | |
| *C10M 133/56* | (2006.01) | |
| *C10M 159/00* | (2006.01) | |
| *F02B 43/10* | (2006.01) | |

(52) U.S. Cl.
CPC ......... *C10M 161/00* (2013.01); *C08F 255/02* (2013.01); *C08L 51/00* (2013.01); *C10M 133/56* (2013.01); *C10M 159/005* (2013.01); *C10M 159/12* (2013.01); *C10M 169/042* (2013.01); *F01M 9/04* (2013.01); *F02B 43/12* (2013.01); *C10M 2203/1025* (2013.01); *C10M 2207/028* (2013.01); *C10M 2209/084* (2013.01); *C10M 2209/086* (2013.01); *C10M 2209/103* (2013.01); *C10M 2215/06* (2013.01); *C10M 2215/28* (2013.01); *C10M 2217/06* (2013.01); *C10M 2219/044* (2013.01); *C10M 2219/046* (2013.01); *C10M 2223/045* (2013.01); *C10N 2220/021* (2013.01); *C10N 2230/02* (2013.01); *C10N 2230/04* (2013.01); *C10N 2230/10* (2013.01); *C10N 2230/18* (2013.01); *C10N 2230/78* (2013.01); *C10N 2240/102* (2013.01); *C10N 2260/06* (2013.01); *C10N 2260/09* (2013.01); *C10N 2260/14* (2013.01); *F02B 2043/103* (2013.01)

(58) Field of Classification Search
CPC .............. C10M 161/00; C10M 159/12; C10M 169/042; C10M 133/56; C10M 159/005; C10M 2217/06; C10M 2203/1025; C10M 2207/028; C10M 2209/084; C10M 2209/086; C10M 2209/103; C10M 2215/06; C10M 2219/044; C10M 2219/046; C10M 2223/045; C10M 2215/28; C10N 2230/04; C10N 2230/10; C10N 2230/18; C10N 2230/02; C10N 2240/102; C10N 2220/021; C10N 2230/78; C10N 2260/09; C10N 2260/06; C10N 2260/14; F01M 9/04; F02B 43/12; F02B 2043/103; C08F 255/02; C08L 51/00

See application file for complete search history.

(56) References Cited

U.S. PATENT DOCUMENTS

| | | |
|---|---|---|
| 2,551,813 A | 5/1951 | Pinkney et al. |
| 2,992,708 A | 7/1961 | Lyon |
| 3,018,291 A | 1/1962 | Anderson et al. |
| 3,024,237 A | 3/1962 | Drummond et al. |
| 3,100,673 A | 8/1963 | Ulmer et al. |
| 3,172,892 A | 3/1965 | Le Suer et al. |
| 3,219,666 A | 11/1965 | Norman et al. |
| 3,272,746 A | 9/1966 | Le Suer et al. |
| 3,361,673 A | 1/1968 | Stuart et al. |
| 3,381,022 A | 4/1968 | Le Suer et al. |
| 3,560,455 A | 2/1971 | Hazen et al. |
| 3,819,660 A | 6/1974 | Cahill et al. |
| 3,912,764 A | 10/1975 | Palmer, Jr. |
| 4,152,499 A | 5/1979 | Boerzel et al. |
| 4,234,435 A | 11/1980 | Meinhardt et al. |
| 4,240,916 A | 12/1980 | Rossi |
| 4,605,808 A | 8/1986 | Samson |
| 5,112,507 A | 5/1992 | Harrison |
| 5,241,003 A | 8/1993 | Degonia et al. |
| 5,286,799 A | 2/1994 | Harrison et al. |
| 5,319,030 A | 6/1994 | Harrison et al. |
| 5,334,321 A | 8/1994 | Harrison et al. |
| 5,356,552 A | 10/1994 | Harrison et al. |
| 5,523,417 A | 6/1996 | Blackborow et al. |
| 5,792,729 A | 8/1998 | Harrison et al. |
| 6,030,930 A | 2/2000 | Emert et al. |
| 6,156,850 A | 12/2000 | Harrison et al. |
| 6,284,716 B1 | 9/2001 | Gunther et al. |
| 6,451,920 B1 | 9/2002 | Harrison et al. |
| 6,512,055 B2 | 1/2003 | Gunter et al. |
| 7,745,541 B2 * | 6/2010 | Ruhe, Jr. ............... C10M 159/12 525/327.6 |
| 7,745,542 B2 | 6/2010 | Ruhe, Jr. et al. |

(Continued)

FOREIGN PATENT DOCUMENTS

| | | |
|---|---|---|
| EP | 0355895 | 2/1990 |
| EP | 0587381 | 3/1994 |

(Continued)

*Primary Examiner* — Cephia D Toomer
(74) *Attorney, Agent, or Firm* — Carlton Virassammy

(57) ABSTRACT

This invention encompasses lubricating oil compositions comprising a base oil, a biodiesel fuel and a dispersant. A method for inhibiting viscosity increase in a diesel engine fueled at least in part with a biodiesel fuel is also described.

26 Claims, No Drawings

(56) References Cited

U.S. PATENT DOCUMENTS

| | | |
|---|---|---|
| 7,816,309 B2 | 10/2010 | Stokes et al. |
| 7,820,604 B2 | 10/2010 | Ruhe, Jr. et al. |
| 7,838,474 B2 | 11/2010 | Boffa |
| 7,858,566 B2 | 12/2010 | Ruhe, Jr. et al. |
| 7,928,044 B2 | 4/2011 | Stokes et al. |
| 7,960,322 B2 | 6/2011 | Boffa |
| 7,964,002 B2 | 6/2011 | DeBlase et al. |
| 7,964,543 B2 | 6/2011 | Harrison et al. |
| 8,067,347 B2 | 11/2011 | Ruhe, Jr. et al. |
| 8,394,747 B2 | 3/2013 | Harrison et al. |
| 8,455,681 B2 | 6/2013 | Harrison et al. |
| 8,680,029 B2 | 3/2014 | Habeeb et al. |
| 8,722,927 B2 | 5/2014 | Harrison et al. |
| 8,729,297 B2 | 5/2014 | Harrison et al. |
| 9,090,849 B2 | 7/2015 | Adamczewska et al. |
| 2007/0113467 A1 | 5/2007 | Abou-Nemeh |
| 2008/0182768 A1 | 7/2008 | Devlin et al. |
| 2011/0207642 A1 | 8/2011 | Strickland et al. |
| 2015/0033617 A1 | 2/2015 | Arondel et al. |
| 2015/0105306 A1 | 4/2015 | Nelson |
| 2015/0307803 A1* | 10/2015 | Zhang .................. C10M 141/02 508/417 |

FOREIGN PATENT DOCUMENTS

| | | | |
|---|---|---|---|
| EP | 0602863 | | 6/1994 |
| EP | 1489281 | | 12/2004 |
| EP | 1712605 | | 10/2006 |
| EP | 1717300 | | 11/2006 |
| EP | 2083024 | | 7/2009 |
| EP | 2290041 | * | 3/2011 |
| EP | 2290041 | | 8/2012 |

\* cited by examiner

LUBRICATING OIL COMPOSITIONS COMPRISING A BIODIESEL FUEL AND A DISPERSANT

FIELD OF THE INVENTION

Provided herein are lubricating oil compositions comprising a base oil, and a dispersant, where the composition is contaminated with at least 0.3 wt. % of a biodiesel fuel or decomposition products thereof. A method for inhibiting viscosity increase in a diesel engine fueled at least in part with a biodiesel fuel is described.

BACKGROUND OF THE INVENTION

The contamination or dilution of lubricating engine oils in internal combustion engines such as biodiesel engines has been an Industry concern. Biodiesel fuels comprise components of low volatility which are slow to vaporize after injecting into the cylinders of the biodiesel engine. This may result in an accumulation of these components of low volatility on the cylinder wall where they can be subsequently deposited onto the crankshaft by the action of the piston rings. Because biodiesel fuels generally have low oxidative stability, these deposits on the cylinder wall or in the crankshaft can degrade oxidatively and form polymerized and cross-linked biodiesel gums, sludges or varnish-like deposits on the metal surfaces that may damage the biodiesel engine or the crankshaft in addition to increasing the viscosity of the lubricant. Furthermore, biodiesel fuels and resulting partially combusted decomposition products can contaminate the engine's lubricants. These biodiesel contaminants further contribute to the formation of oxidization of the engine oil, deposit formation, and corrosion, particularly of lead and copper based bearing material. Therefore, there is a need for improved additives formulations to solve the problems of oxidation, corrosion, deposits, and viscosity increase within the engines.

DESCRIPTION OF RELATED ART

The polysuccinimide dispersant is a non-conventional polysuccinimide dispersant. For representative methods a making polysuccinimide dispersants and other dispersants of the invention please refer to U.S. Pat. Nos. 7,745,541, 7,745,542, 7,816,309, 7,928,044, 7,820,604, 7,858,566, and 8,067,347.

U.S. Pat. Nos. 7,960,322 and 7,838,474, 7,964,002 8,680,029, 9,090,849, U.S. Patent Application Nos. 20070113467, 2008/0182768, 2011/0207642, 2015/0033617, 2015/0307803, and foreign application EP2290041, disclose additive formulations or methods to address oxidation and deposits within the engine due to the influence of biodiesel.

SUMMARY OF THE INVENTION

Provided herein are lubricating oil compositions that can inhibit the viscosity increase of the lubricant. In one aspect, the present invention is directed to a lubricating oil composition contaminated with at least about 0.3 wt % of a biodiesel fuel or a decomposition product thereof, based on the total weight of the lubricating oil composition, comprising a major amount of base oil of lubricating viscosity; and a dispersant, said dispersant prepared by the process which comprises reacting (A) at least one of the following copolymers:
(i) a copolymer obtained by free radical copolymerization of components comprising:
(a) at least one monoethylenically unsaturated $C_3$-$C_{28}$ monocarboxylic acid or ester thereof, or $C_4$-$C_{28}$ dicarboxylic acid, anhydride or ester thereof;
(b) at least one 1-olefin comprising about 2 to 40 carbon atoms or at least one polyolefin comprising about 4 to 360 carbon atoms and having a terminal copolymerizable group in the form of a vinyl, vinylidene or alkyl vinylidene group or mixtures thereof; and
(c) at least one monoolefin compound which is copolymerizable with the monomers of (a) and (b) and is selected from the group consisting of:
(1) an alkyl vinyl ether and an allyl alkyl ether where the alkyl group is hydroxyl, amino, dialkylamino or alkoxy substituted or is unsubstituted, and containing 1 to 40 carbon atoms;
(2) an alkyl amine and an N-alkylamide of a monoethylenically unsaturated mono- or dicarboxylic acid of 3 to 10 carbon atoms wherein the alkyl substituent contains 1 to 40 carbon atoms;
(3) a N-vinylcarboxamide of carboxylic acids of 1 to 8 carbon atoms;
(4) a N-vinyl substituted nitrogen-containing heterocyclic compound; and
(5) at least one 1-olefin comprising about 2 to 40 carbon atoms or at least one polyolefin comprising about 4 to about 360 carbon atoms and having a terminal copolymerizable group in the form of a vinyl, vinylidene or alkyl vinylidene group or mixtures thereof, provided that the olefin employed is not the same as the olefin employed in (i)(b);
(ii) a copolymer obtained by reacting compound (i)(a) and compound (i)(b) in the presence of a free radical initiator;
(iii) a copolymer obtained by (a) reacting compound (i)(a) with compound (i)(b) or (i)(c) in a non-free radical catalyzed reaction in the presence of copolymer (i) or copolymer (ii) or both; or by (b) contacting copolymer (i) or copolymer (ii) or both with the non-free radical catalyzed reaction product of compound (i)(a) and compound (i)(b) or (i)(c); with
(B) at least one ether compound selected from the group consisting of an ether polyamine, a polyether polyamine, a polyether amino alcohol, a polyether amino thiol, and a polyether polyol; and
(C) at least one aromatic amine; and
wherein the amount of said dispersant present in the lubricating oil composition is at least about 2 wt. % actives, based on the total weight of the lubricating oil composition.

Also provided herein are methods of lubricating an engine with a lubricating oil composition that can inhibit the viscosity increase in an engine. In one aspect, the methods comprise a method of lubricating a diesel engine fueled at least in part with a biodiesel fuel which comprises operating the engine with a lubricating oil composition contaminated with at least 0.3 wt % of a biodiesel fuel or a decomposition product thereof, based on the total weight of the lubricating oil composition, wherein the lubricating oil composition comprises a major amount of base oil of lubricating viscosity; and a dispersant, said dispersant prepared by the process which comprises reacting (A) at least one of the following copolymers:
  (i) a copolymer obtained by free radical copolymerization of components comprising:
    (a) at least one monoethylenically unsaturated $C_3$-$C_{28}$ monocarboxylic acid or ester thereof, or $C_4$-$C_{28}$ dicarboxylic acid, anhydride or ester thereof;
    (b) at least one 1-olefin comprising about 2 to 40 carbon atoms or at least one polyolefin comprising about 4 to 360 carbon atoms and having a terminal copolymerizable group in the form of a vinyl, vinylidene or alkyl vinylidene group or mixtures thereof; and
    (c) at least one monoolefin compound which is copolymerizable with the monomers of (a) and (b) and is selected from the group consisting of:
      (1) an alkyl vinyl ether and an allyl alkyl ether where the alkyl group is hydroxyl, amino, dialkylamino or alkoxy substituted or is unsubstituted, and containing 1 to 40 carbon atoms;
      (2) an alkyl amine and an N-alkylamide of a monoethylenically unsaturated mono- or dicarboxylic acid of 3 to 10 carbon atoms wherein the alkyl substituent contains 1 to 40 carbon atoms;
      (3) a N-vinylcarboxamide of carboxylic acids of 1 to 8 carbon atoms;
      (4) a N-vinyl substituted nitrogen-containing heterocyclic compound; and
      (5) at least one 1-olefin comprising about 2 to 40 carbon atoms or at least one polyolefin comprising about 4 to about 360 carbon atoms and having a terminal copolymerizable group in the form of a vinyl, vinylidene or alkyl vinylidene group or mixtures thereof, provided that the olefin employed is not the same as the olefin employed in (i)(b);
  (ii) a copolymer obtained by reacting compound (i)(a) and compound (i)(b) in the presence of a free radical initiator;
  (iii) a copolymer obtained by (a) reacting compound (i)(a) with compound (i)(b) or (i)(c) in a non-free radical catalyzed reaction in the presence of copolymer (i) or copolymer (ii) or both; or by (b) contacting copolymer (i) or copolymer (ii) or both with the non-free radical catalyzed reaction product of compound (i)(a) and compound (i)(b) or (i)(c); with
(B) at least one ether compound selected from the group consisting of an ether polyamine, a polyether polyamine, a polyether amino alcohol, a polyether amino thiol, and a polyether polyol; and
(C) at least one aromatic amine; and
wherein the amount of said dispersant present in the lubricating oil composition is at least about 2 wt. % actives, based on the total weight of the lubricating oil composition.

In some embodiments, the lubricating oil composition disclosed herein is substantially free of a vegetable oil or animal oil. In other embodiments, the lubricating oil composition disclosed herein is free of a vegetable oil or animal oil.

In certain embodiments, the lubricating oil composition disclosed herein further comprises at least one additive selected from the group consisting of antioxidants, antiwear agents, detergents, rust inhibitors, demulsifiers, friction modifiers, multi-functional additives, viscosity index improvers, pour point depressants, foam inhibitors, metal deactivators, dispersants, corrosion inhibitors, lubricity improvers, thermal stability improvers, anti-haze additives, icing inhibitors, dyes, markers, static dissipaters, biocides and combinations thereof. In other embodiments, the at least one additive is at least one antiwear agent. In further embodiments, the at least one antiwear agent comprises a zinc dialkyl dithiophosphate compound. In still further embodiments, the phosphorous content derived from the zinc dialkyldithiophosphate compound is from about 0.001 wt. % to about 0.5 wt. %, from about 0.01 wt. % to about 0.08 wt. %, or from about 0.01 wt. % to about 0.12 wt. %, based on the total weight of the lubricating oil composition.

In some embodiments, the sulfated ash content of the lubricating oil composition disclosed herein is at most about 2.0, 1.5, 1.0, or 0.5 wt. %, based on the total weight of the lubricating oil composition.

In certain embodiments, the biodiesel fuel of the lubricating oil composition disclosed herein comprises an alkyl ester of a long chain fatty acid. In further embodiments, the long chain fatty acid comprises from about 12 carbon atoms to about 30 carbon atoms.

In certain embodiments, the amount of the biodiesel fuel is from at least 0.3 wt. %, or from about 0.3 to 20 wt. %, 1 wt. % to about 20 wt. %, 1 wt. % to about 15 wt. %, 1 wt. % to about 10 wt. %, 1 wt. % to about 9 wt. %, 1 wt. % to about 8 wt. %, 1 wt. % to about 7 wt. %, 4 wt. % to about 8 wt. %, or from 1 wt. %, 2 wt. %, 3 wt. %, 4 wt. %, 5 wt. %, 6 wt. %, 7 wt. %, 8 wt. %, or 9 wt. %, based on the total weight of the lubricating oil composition.

In certain embodiments, the amount of the dispersant present in the lubricating oil composition is at least about 2 wt. % actives, from 2 to 10 wt. % actives, from 2 to 8 wt. % actives, from 2 to 6 wt. % actives, and from 2 to 5 wt. % actives, based on the total weight of the lubricating oil composition.

In some embodiments, the amount of the base oil of the lubricating oil composition disclosed herein is at least 40 wt. %, based on the total weight of the lubricating oil composition. In further embodiments, the base oil has a kinematic viscosity from about 4 cSt to about 20 cSt at 100° C.

Other embodiments will be in part apparent and in part pointed out hereinafter.

Definitions

To facilitate understanding of the subject matter disclosed herein, a number of terms, abbreviations or other shorthand as used herein are defined below. Any term, abbreviation or shorthand not defined is understood to have the ordinary meaning used by a skilled artisan contemporaneous with the submission of this application.

"Biofuel" refers to a fuel (e.g., methane) that is produced from renewable biological resources. The renewable biological resources include recently living organisms and their metabolic byproducts (e.g., feces from cows), plants, or biodegradable outputs from industry, agriculture, forestry and households. Examples of biodegradable outputs include straw, timber, manure, rice husks, sewage, biodegradable waste, food leftovers, wood, wood waste, wood liquors, peat, railroad ties, wood sludge, spent sulfite liquors, agricultural waste, tires, fish oils, tall oil, sludge waste, waste alcohol, municipal solid waste, landfill gases, other waste, and ethanol blended into motor gasoline. Plants that can be used to produce biofuels include corn, soybeans, flaxseed, rapeseed, sugar cane, palm oil and jatropha. Examples of biofuel include alcohol derived from fermented sugar and biodiesel derived from vegetable oil or wood.

"Biodiesel fuel" refers to an alkyl ester made from esterification or transesterification of natural oils for use to power diesel engines. In some embodiments, the biodiesel fuel is produced by esterifying a natural oil with an alcohol (e.g., ethanol or methanol) in the presence of a catalyst to form an alkyl ester. In other embodiments, the biodiesel fuel comprises at least one alkyl ester of a long chain fatty acid derived from a natural oil such as vegetable oils or animal fats. In further embodiments, the long chain fatty acid contains from about 8 carbon atoms to about 40 carbon atoms, from about 12 carbon atoms to about 30 carbon atoms, or from about 14 carbon atoms to about 24 carbon atoms. In certain embodiments, the biodiesel fuel disclosed herein is used to power conventional diesel-engines designed to be powered by petroleum diesel fuels. The biodiesel fuel generally is biodegradable and non-toxic, and typically produces about 60% less net carbon dioxide emissions than petroleum-based diesel.

"Petrodiesel fuel" refers to a diesel fuel produced from petroleum.

"A major amount" of a base oil refers to the amount of the base oil is at least 40 wt. % of the lubricating oil composition. In some embodiments, "a major amount" of a base oil refers to an amount of the base oil more than 50 wt. %, more than 60 wt. %, more than 70 wt. %, more than 80 wt. %, or more than 90 wt. % of the lubricating oil composition.

"Sulfated ash content" refers to the amount of metal-containing additives (e.g., calcium, magnesium, molybdenum, zinc, etc.) in a lubricating oil and is typically measured according to ASTM D874, which is incorporated herein by reference.

A composition that is "substantially free" of a compound refers to a composition which contains less than 20 wt. %, less than 10 wt. %, less than 5 wt. %, less than 4 wt. %, less than 3 wt. %, less than 2 wt. %, less than 1 wt. %, less than 0.5 wt. %, less than 0.1 wt. %, or less than 0.01 wt. % of the compound, based on the total weight of the composition.

A composition that is "free" of a compound refers to a composition which contains from 0.001 wt. % to 0 wt. % of the compound, based on the total weight of the composition.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

The term "PIB" is an abbreviation for polyisobutene.

The term "PIBSA" is an abbreviation for polyisobutenyl succinic anhydride.

The term "polyPIBSA" refers to a class of copolymers employed within the scope of the present invention which are copolymers of polyisobutene and a monoethylenically unsaturated $C_3$-$C_{28}$ monocarboxylic acid or ester thereof, or a $C_4$-$C_{28}$ dicarboxylic acid, anhydride or ester thereof which have carboxyl groups, preferably succinic groups, and polyisobutyl groups. The preferred polyPIBSA is a copolymer of polyisobutene and maleic anhydride having the general formula 1:

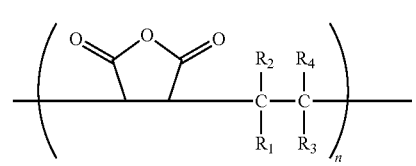

Formula 1 wherein n is one or greater; $R_1$, $R_2$, $R_3$ and $R_4$ are selected from hydrogen, methyl and polyisobutyl having at least about 30 carbon atoms (preferably at least about 50 carbon atoms) wherein either $R_1$ and $R_2$ are hydrogen and one of $R_3$ and $R_4$ is methyl and the other is polyisobutyl, or $R_3$ and $R_4$ are hydrogen and one of $R_1$ and $R_2$ is methyl and the other is polyisobutyl. The polyPIBSA copolymer may be alternating, block, or random.

The term "succinic group" refers to a group having the formula 2:

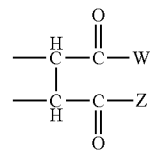

Formula 2 wherein W and Z are independently selected from the group consisting of —OH, —Cl, —O— lower alkyl or taken together are —O— to form a succinic anhydride group. The term "—O— lower alkyl" is meant to include alkoxy of from about 1 to about 6 carbon atoms.

The term "degree of polymerization" refers to the average number of repeating structural units in the polymer chain.

The term "terpolymer" refers to a polymer derived from the free radical copolymerization of at least 3 monomers.

The term "1-olefin" refers to a monounsaturated olefin that has the double bond in the 1-position. They can also be called alpha-olefins, and have the following structure:

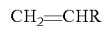

where R is the rest of the olefin molecule.

The term "1,1-disubstituted olefin" refers to a disubstituted olefin, also called a vinylidene olefin, that has the following structure:

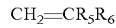

wherein $R_5$ and $R_6$ are the same or different, and constitute the rest of the olefin molecule. Preferably, either $R_5$ or $R_6$ is a methyl group, and the other is not.

The term "succinimide" is understood in the art to include many of the amide, imide, etc. species which are also formed by the reaction of a succinic anhydride with an amine. The predominant product, however, is succinimide and this term has been generally accepted as meaning the product of a reaction of an alkenyl- or alkyl-substituted succinic acid or anhydride with an amine. Alkenyl or alkyl succinimides are disclosed in numerous references and are well known in the art. Certain fundamental types of succinimides and related materials encompassed by the term of art "succinimide" are taught in U.S. Pat. Nos. 2,992,708; 3,018,291; 3,024,237; 3,100,673; 3,219,666; 3,172,892; and 3,272,746, the disclosures of which are hereby incorporated by reference.

The term "polysuccinimide" refers to the reaction product of a succinic group-containing copolymer with an amine.

The term "alkenyl or alkylsuccinic acid derivative" refers to a structure having the formula 3:

Formula 3

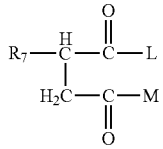

wherein $R_7$ is selected from hydrogen, methyl and polyisobutyl having at least about 30 carbon atoms (preferably at least about 50 carbon atoms); wherein L and M are independently selected from the group consisting of —OH, —Cl, —O— lower alkyl or taken together are —O— to form an alkenyl or alkylsuccinic anhydride group.

The term "alkylvinylidene" or "alkylvinylidene isomer" refers to high molecular weight olefins and polyalkylene components having the vinylidene structure of formula 4:

Formula 4

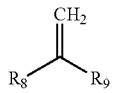

wherein $R_8$ is alkyl or substituted alkyl of sufficient chain length to give the resulting molecule solubility in lubricating oils and fuels, thus $R_8$ generally has at least about 30 carbon atoms, preferably at least about 50 carbon atoms and $R_9$ is lower alkyl of from about 1 to about 6 carbon atoms.

The term "soluble in lubricating oil" refers to the ability of a material to dissolve in aliphatic and aromatic hydrocarbons such as lubricating oils or fuels in essentially all proportions.

The term "high molecular weight olefins" refers to olefins (including polymerized olefins having a residual unsaturation) of sufficient molecular weight and chain length to lend solubility in lubricating oil to their reaction products. Typically olefins having about 30 carbons or more suffice.

The term "high molecular weight polyalkyl" refers to polyalkyl groups of sufficient molecular weight such that the products prepared having such sufficient molecular weight are soluble in lubricating oil. Typically these high molecular weight polyalkyl groups have at least about 30 carbon atoms, preferably at least about 50 carbon atoms. These high molecular weight polyalkyl groups may be derived from high molecular weight polyolefins.

The term "amino" refers to —$NR_{10}R_{11}$ wherein $R_{10}$ and $R_{11}$ are independently hydrogen or a hydrocarbyl group.

The term "alkyl" refers to both straight- and branched-chain alkyl groups.

The term "lower alkyl" refers to alkyl groups having from about 1 to about 6 carbon atoms and includes primary, secondary and tertiary alkyl groups. Typical lower alkyl groups include, for example, methyl, ethyl, n-propyl, isopropyl, n-butyl, sec-butyl, t-butyl, n-pentyl, iso-pentyl, n-hexyl and the like.

The term "polyalkyl" refers to an alkyl group that is generally derived from polyolefins which are polymers or copolymers of mono-olefins, particularly 1-mono-olefins, such as ethylene, propylene, butylene, and the like. Preferably, the mono-olefin employed will have from about 2 to about 24 carbon atoms, and more preferably, from about 3 to about 12 carbon atoms.

More preferred mono-olefins include propylene, butylene, particularly isobutylene, 1-octene and 1-decene. Preferred, polyolefins prepared from such mono-olefins include polypropylene, polybutene, especially polyisobutene.

DETAILED DESCRIPTION OF THE INVENTION

Provided herein are lubricating oil compositions contaminated with at least about 0.3 wt % of a biodiesel fuel or a decomposition product thereof, based on the total weight of the lubricating oil composition, comprising a major amount of base oil of lubricating viscosity; and a dispersant, said dispersant prepared by the process which comprises reacting
(A) at least one of the following copolymers:
  (i) a copolymer obtained by free radical copolymerization of components comprising:
    (a) at least one monoethylenically unsaturated $C_3$-$C_{28}$ monocarboxylic acid or ester thereof, or $C_4$-$C_{28}$ dicarboxylic acid, anhydride or ester thereof;
    (b) at least one 1-olefin comprising about 2 to 40 carbon atoms or at least one polyolefin comprising about 4 to 360 carbon atoms and having a terminal copolymerizable group in the form of a vinyl, vinylidene or alkyl vinylidene group or mixtures thereof; and
    (c) at least one monoolefin compound which is copolymerizable with the monomers of (a) and (b) and is selected from the group consisting of:
      (1) an alkyl vinyl ether and an allyl alkyl ether where the alkyl group is hydroxyl, amino, dialkylamino or alkoxy substituted or is unsubstituted, and containing 1 to 40 carbon atoms;
      (2) an alkyl amine and an N-alkylamide of a monoethylenically unsaturated mono- or dicarboxylic acid of 3 to 10 carbon atoms wherein the alkyl substituent contains 1 to 40 carbon atoms;
      (3) a N-vinylcarboxamide of carboxylic acids of 1 to 8 carbon atoms;
      (4) a N-vinyl substituted nitrogen-containing heterocyclic compound; and
      (5) at least one 1-olefin comprising about 2 to 40 carbon atoms or at least one polyolefin comprising about 4 to about 360 carbon atoms and having a terminal copolymerizable group in the form of a vinyl, vinylidene or alkyl vinylidene group or mixtures thereof, provided that the olefin employed is not the same as the olefin employed in (i)(b);
  (ii) a copolymer obtained by reacting compound (i)(a) and compound (i)(b) in the presence of a free radical initiator;
  (iii) a copolymer obtained by (a) reacting compound (i)(a) with compound (i)(b) or (i)(c) in a non-free radical catalyzed reaction in the presence of copolymer (i) or copolymer (ii) or both; or by (b) contacting copolymer (i) or copolymer (ii) or both with the non-free radical catalyzed reaction product of compound (i)(a) and compound (i)(b) or (i)(c); with
(B) at least one ether compound selected from the group consisting of an ether polyamine, a polyether polyamine, a polyether amino alcohol, a polyether amino thiol, and a polyether polyol; and
(C) at least one aromatic amine; and
wherein the amount of said dispersant present in the lubricating oil composition is at least about 2 wt. % actives, based on the total weight of the lubricating oil composition.

(A) Copolymer Reactants
Copolymer (i)
(a) The Monoethylenically Unsaturated Monocarboxylic Acid or Ester Thereof or Dicarboxylic Acid, Anhydride or Ester Thereof In the present invention, at least one monoethylenically unsaturated $C_3$-$C_{28}$ monocarboxylic acid or ester thereof, or $C_4$-$C_{28}$ dicarboxylic acid, anhydride or ester thereof is used to prepare the copolymers of copolymer (i). Preferably the at least one monoethylenically unsaturated $C_3$-$C_{28}$ monocarboxylic acid or ester thereof, or $C_4$-$C_{28}$ dicarboxylic acid, anhydride or ester thereof is a dicarboxylic acid, anhydride or ester thereof.

The general formula of the preferred dicarboxylic acid, anhydride or ester thereof is general formula 5:

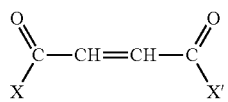

Formula 5 wherein X and X' are the same or different, provided that at least one of X and X' is a group that is capable of reacting to esterify alcohols, form amides or amine salts with ammonia or amines, form metal salts with reactive metals or basically reacting metal compounds and otherwise function as acylating agents. Typically, X and/or X' is —OH, —O-hydrocarbyl, OM+ where M+ represents one equivalent of a metal, ammonium or amine cation, —NH$_2$, —Cl, —Br, and taken together X and X' can be —O— so as to form an anhydride. Preferably X and X' are such that both carboxylic functions can enter into acylation reactions. Maleic anhydride is a preferred reactant. Other suitable reactants include electron-deficient olefins such as monophenyl maleic anhydride; monomethyl, dimethyl, monochloro, monobromo, monofluoro, dichloro and difluoro maleic anhydride; N-phenylmaleimide and other substituted maleimides, isomaleimides; fumaric acid, maleic acid, alkyl hydrogen maleates and fumarates, dialkyl fumarates and maleates, fumaronilic acids and maleanic acids; and maleonitrile and fumaronitrile.

Suitable monomers for (a) are monoethylenically unsaturated dicarboxylic acids or anhydrides of from about 4 to 28 carbon atoms selected from the group consisting of maleic acid, fumaric acid, itaconic acid, mesaconic acid, methylenemalonic acid, citraconic acid, maleic anhydride, itaconic anhydride, citraconic anhydride and methylenemalonic anhydride, and mixtures of these with one another, among which maleic anhydride is preferred.

Other suitable monomers are monoethylenically unsaturated $C_3$-$C_{28}$-monocarboxylic acids selected from the group consisting of acrylic acid, methacrylic acid, dimethacrylic acid, ethylacrylic acid, crotonic acid, allylacetic acid and vinylacetic acid, among which acrylic and methacrylic acid are preferred. Another group of suitable monomers is $C_1$-$C_{40}$ alkyl esters of monoethylenecially unsaturated $C_3$-$C_{10}$ mono- or dicarboxylic acids such as ethyl acrylate, butyl acrylate, 2-ethyl acrylate, decyl acrylate, docedyl acrylate, loctadecyl acrylate and the esters of industrial alcohol mixtures of from about 14 to 28 carbon atoms, ethyl methacrylate, 2-ethylhexyl methacrylate, decyl methacrylate, octadecyl methacrylate, monobutyl maleate, dibutyl maleate, monodecyl maleate, didodecyl maleate, monooctadecyl maleate, and dioctadecyl maleate.

(b) The 1-Olefin or Polyolefin

In the present invention at least one 1-olefin comprising about 2 to 40 carbon atoms or at least one polyolefin comprising about 4 to 360 carbon atoms and having a terminal copolymerizable group in the form of vinyl, vinylidene or alkyl vinylidene group is employed.

Suitable 1-olefins for preparing copolymer (i) comprise from about 2 to about 40 carbon atoms, preferably from about 6 to about 30 carbon atoms, such as decene, dodecene, octadecene and mixtures of $C_{20}$-$C_{24}$-1-olefins and $C_{24}$-$C_{28}$-1-olefins, more preferably from about 10 to about 20 carbon atoms. Preferably 1-olefins, which are also known as alpha olefins, with number average molecular weights in the range 100-4,500 or more are preferred, with molecular weights in the range of 200-2,000 being more preferred. For example, alpha olefins obtained from the thermal cracking of paraffin wax. Generally, these olefins range from about 5 to about 20 carbon atoms in length. Another source of alpha olefins is the ethylene growth process which gives even number carbon olefins. Another source of olefins is by the dimerization of alpha olefins over an appropriate catalyst such as the well known Ziegler catalyst. Internal olefins are easily obtained by the isomerization of alpha olefins over a suitable catalyst such as silica. Preferably, 1-olefins from $C_6$-$C_{30}$ are used because these materials are commercially readily available, and because they offer a desirable balance of the length of the molecular tail, and the solubility of the terpolymer in nonpolar solvents. Mixtures of olefins may also be employed.

Suitable polyolefins for preparing copolymer (i) are polyolefins comprising about 4 to about 360 carbon atoms. These polymers have a number average molecular weight ($M_n$) of from about 56 to about 5000 g/mol. Examples of these are oligomers of ethylene, of butene, including isobutene, and of branched isomers of pentene, hexene, octene and of decene, the copolymerizable terminal group of the oligomer being present in the form of a vinyl, vinylidene or alkylvinylidene group, oligopropenes and oligopropene mixtures of from about 9 to about 200 carbon atoms and in particular oligoisobutenes, as obtainable, for example, according to DE-A 27 02 604, corresponding U.S. Pat. No. 4,152,499, are preferred. Mixtures of the stated oligomers are also suitable, for example, mixtures of ethylene and other alpha olefins. Other suitable polyolefins are described in U.S. Pat. No. 6,030,930 which is herein incorporated by reference. The molecular weights of the oligomers may be determined in a conventional manner by gel permeation chromatography.

The copolymerizable polyolefin that is reacted with the unsaturated mono- or di-carboxylic reactant are polymers comprising a major amount of $C_2$-$C_8$ mono-olefin, e.g., ethylene, propylene, butylene, isobutylene and pentene. These polymers can be homopolymers such as polyisobutylene as well as copolymers of 2 or more such olefins such as copolymers of: ethylene and propylene, butylene, and isobutylene, etc. Other copolymers include those in which a minor amount of the copolymer monomers, e.g., from about 1 to about 20 mole % is a $C_4$-$C_8$ nonconjugated diolefin, e.g., a copolymer of isobutylene and butadiene or a copolymer of ethylene, propylene and 1,4-hexadiene, etc.

The polyolefin polymer usually contains from about 4 to about 360 carbon atoms, although preferably 8 to 200 carbon atoms; and more preferably from about 12 to about 175 carbon atoms.

Since the high molecular weight olefins used to prepare the copolymers of the present invention are generally mixtures of individual molecules of different molecular weights, individual copolymer molecules resulting will generally contain a mixture of high molecular weight polyalkyl groups of varying molecular weight. Also, mixtures of copolymer molecules having different degrees of polymerization will be produced.

The copolymers of the present invention have an average degree of polymerization of 1 or greater, preferably from about 1.1 to about 20, and more preferably from about 1.5 to about 10.

(c) The Mono-Olefin Compound

The present invention employs at least one monoolefin compound which is copolymerizable with the monomers of (a) and (b) and is selected from the group consisting of:

(1) an alkyl vinyl ether and an allyl alkyl ether where the alkyl group is hydroxyl, amino, dialkylamino or alkoxy substituted or is unsubstituted, and containing from about 1 to about 40 carbon atoms;

(2) an alkyl amine and an N-alkylamide of a monoethylenically unsaturated mono- or dicarboxylic acid of from about 3 to about 10 carbon atoms wherein the alkyl substituent contains from about 1 to about 40 carbon atoms;

(3) a N-vinylcarboxamide of carboxylic acids of from about 1 to about 8 carbon atoms;

(4) a N-vinyl substituted nitrogen-containing heterocyclic compound; and (5) at least one 1-olefin comprising about 2 to 40 carbon atoms or at least one polyolefin comprising from about 4 to about 360 carbon atoms and having a terminal copolymerizable group in the form of a vinyl, vinylidene or alkyl vinylidene group or mixtures thereof, provided that the olefin employed is not the same as the olefin employed in (i)(b);

(1) Suitable monomers include the following: vinyl and allyl alkyl ethers where the alkyl radical is of about 1 to about 40 carbon atoms are also suitable, and the alkyl radical may carry further substituents, such as hydroxyl, amino, dialkylamino or alkoxy. Examples are methyl vinyl ether, ethyl vinyl ether, propyl vinyl ether, isobutyl vinyl ether, 2-ethylhexyl vinyl ether, decylvinyl ether, dodecyl vinyl ether, octadecyl vinyl ether, 2-(diethylamino)ethyl vinyl ether, 2-(di-n-butylamino) ethyl vinyl ether, and the corresponding allyl ethers.

(2) Another group of monomers comprises $C_1$-$C_{40}$ alkyl amines and $C_1$-$C_{40}$—N-alkylamides of monoethylenically unsaturated $C_3$-$C_{10}$-mono- or dicarboxylic acids, such as dimethylaminoethyl acrylate, diethylaminoethyl acrylate, dibutylaminoethyl methacrylate, acrylamide, methacrylamide, N-tert-butylacrylamide, N-octylacrylamide, N,N'-dibutylacrylamide, N-dodecylmethacrylamide and N-octadecylmethacrylamide.

(3) Another group of monomers includes the following: N-vinylcarboxamides of carboxylic acids of from about 1 to about 8 carbon atoms, such as N-vinylformamide, N-vinyl-N-methylformamide, N-vinylacetamide, N-vinyl-N-methylacetramide, N-vinyl-N-ethylacetamide, N-vinyl-N-methylpropionamide and N-vinylpropionamide.

(4) Another group of monomers includes the following: N-vinyl compounds of nitrogen-containing heterocycles, such as N-vinylimidazole, N-vinylmethylimidazole, N-vinylpyrrolidone and N-vinylcaprolactam.

(5) Suitable 1-olefins comprise about 2 to 40 carbon atoms, preferably from about 8 to about 30 carbon atoms, such as decene, dodecene, octadecene and mixtures of $C_{20}$-$C_{24}$-1-olefins and $C_{24}$-$C_{28}$-1-olefins. Preferably 1-olefins, which are also known as alpha olefins, with number average molecular weights in the range of from about 28 to about 560 are preferred, with molecular weights in the range of from about 112 to about 420 being more preferred. For example, alpha olefins obtained from the thermal cracking of paraffin wax may be employed. Generally, these olefins range from about 5 to about 20 carbon atoms in length. Another source of alpha olefins is the ethylene growth process which gives even number carbon olefins. Another source of olefins is by the dimerization of alpha olefins over an appropriate catalyst such as the well known Ziegler catalyst. Internal olefins are easily obtained by the isomerization of alpha olefins over a suitable catalyst such as silica. Preferably, 1-olefins from $C_{10}$-$C_{30}$ are used because these materials are commercially readily available, and because they offer a desirable balance of the length of the molecular tail, and the solubility of the terpolymer in nonpolar solvents. Mixtures of olefins are also suitable.

Preparation of Copolymer (i)

Copolymer reactant (i) may be prepared from well known methods which are described in the art including, but not limited to, those methods which are disclosed in the following patents, which are herein incorporated by reference: Harrison et al., U.S. Pat. No. 5,792,729; Günther et al., U.S. Pat. No. 6,284,716; and Günther et al., U.S. Pat. No. 6,512,055.

In one embodiment of the present invention the copolymer reactant is a polyalkenyl succinic anhydride terpolymer. These terpolymers are composed of at least one of monomers (a) to (c) as described herein.

Typically, the terpolymers of this invention contain at least one of monomers (a) to (c), three components comprising of a monocarboxylic acid or ester thereof, or a dicarboxylic acid or anhydride or ester thereof; a branched olefin; and a monoolefin. In general, these components react to form terpolymers which can be random terpolymers or alternating terpolymers or block terpolymers and can be prepared by known procedures for making copolymers. The monocarboxylic acid or ester thereof or dicarboxylic acid or anhydride or ester thereof is selected from those which were previously disclosed, preferably maleic anhydride.

The degree of polymerization of the terpolymers can vary over a wide range. In general, terpolymers of high molecular weight can be produced at low temperatures, and terpolymers of low molecular weight can be produced at high temperatures.

The terpolymerization is conducted in the presence of a suitable free radical initiator. Examples of suitable polymerization initiators are peroxide compounds, such as terybutyl perpivalate, terybutyl perneocecanoate, tery-butylperethylhexanoate, tertbutylperisobutyrate, di-tert-butyl peroxide, di-tert-amyl peroxide, diacetyl peroxydicaronate and dicyclohexyldicaronate, or azo compounds, such as 2,2'-azobisisobutyrontrile. The initiators may be used alone or as a mixture with one another. Redox co-initiators may also be present. Preferably, the initiator is a peroxide type initiator, e.g., di(t-butyl) peroxide, dicumyl peroxide or azo type initiator, e.g., isobutylnitrile type initiators. Procedures for preparing poly 1-olefin copolymers are, for example, described in U.S. Pat. Nos. 3,560,455 and 4,240,916, hereby incorporated by reference in their entirety. Those procedures could be used to prepare terpolymers. Both patents also describe a variety of initiators.

Copolymer (i), wherein a second olefin is employed in the reaction, can be prepared in the same manner as copolymer (ii) which is described below.

Copolymer (ii)

In another embodiment of the present invention, the copolymer reactant is a copolymer obtained by reacting (a) at least one monoethylenically unsaturated $C_3$-$C_{28}$ monocarboxylic acid or ester thereof, or a $C_4$-$C_{28}$ dicarboxylic acid, anhydride or ester thereof and (b) at least one copolymerizable polymer composed of at least 3-olefin molecules of propene or of a branched 1-olefin of from about 4 to about 10 carbon atoms, having a number average molecular weight $M_n$ of from about 112 to about 5000, and having a terminal copolymerizable group in the form of a vinyl, vinylidene or alkyl vinylidene group in the presence of a free radical initiator.

Thus, preferred copolymers of the present invention are prepared by reacting a "reactive" high molecular weight olefin in which a high proportion of unsaturation, at least about 20% is in the alkylvinylidene configuration, for example of formula 4:

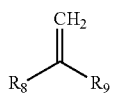

Formula 4 wherein $R_8$ and $R_9$ are an alkyl or substituted alkyl of sufficient chain length to give the resulting molecule stability in lubricating oils and fuels, thus $R_8$ generally has at least about 30 carbon atoms, preferably at least about 50 carbon atoms and $R_9$ is a lower alkyl of from about 1 to about 6 carbon atoms, with an unsaturated acidic reactant in the presence of a free radical initiator.

The product copolymer has alternating polyalkylene and succinic groups and has an average degree of polymerization of 1 or greater.

The preferred copolymers (ii) of the present invention have the general Formula 6:

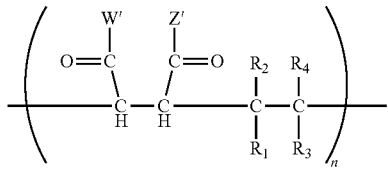

Formula 6 wherein W' and Z' are independently selected from the group consisting of —OH, —O— lower alkyl or taken together are —O— to form a succinic anhydride group, n is one or greater; and $R_1$, $R_2$, $R_3$ and $R_4$ are selected from hydrogen, lower alkyl of from about 1 to about 6 carbon atoms, and high molecular weight polyalkyl wherein either $R_1$ and $R_2$ are hydrogen and one of $R_3$ and $R_4$ is lower alkyl and the other is high molecular weight polyalkyl, or $R_3$ and $R_4$ are hydrogen and one of $R_1$ and $R_2$ is lower alkyl and the other is high molecular weight polyalkyl.

Copolymer (ii) may be alternating, block, or random.

In a preferred embodiment, when maleic anhydride is used as the reactant, the reaction produces copolymers predominately of the following formula 1:

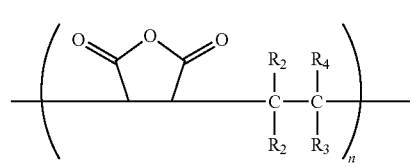

Formula 1 wherein n is from about 1 to about 100, preferably from about 2 to about 20, more preferably from about 2 to about 10, and $R_1$, $R_2$, $R_3$ and $R_4$ are selected from hydrogen, lower alkyl of from about 1 to about 6 carbon atoms and higher molecular weight polyalkyl, wherein either $R_1$ and $R_2$ are hydrogen and one of $R_3$ and $R_4$ is lower alkyl and the other is high molecular weight polyalkyl or $R_3$ and $R_4$ are hydrogen and one of $R_1$ and $R_2$ is lower alkyl and the other is high molecular weight polyalkyl.

Preferably, the high molecular weight polyalkyl group has at least about 30 carbon atoms (preferably at least about 50 carbon atoms). Preferred high molecular weight polyalkyl groups include polyisobutyl groups. Preferred polyisobutyl groups include those having number average molecular weights of from about 500 to about 5000, more preferably from about 900 to about 2500. Preferred lower alkyl groups include methyl and ethyl; especially preferred lower alkyl groups include methyl.

A particularly preferred class of olefin polymers comprises the polybutenes, which are prepared by polymerization of isobutene. These polybutenes are readily available commercial materials well known to those skilled in the art. Disclosures thereof will be found, for example, in U.S. Pat. Nos. 4,152,499 and 4,605,808, which are herein incorporated by reference for their disclosures of suitable polybutenes.

Preferably, 1,1-disubstituted olefins are used to provide a high molecular weight, oil soluble tail in the terpolymer. Preferably the 1,1-disubstituted olefin has a number average $M_n$ of from about 500 to about 5000. One particularly useful 1,1-disubstituted olefin is a 1,1-disubstituted polyisobutylene, such as methylvinylidene polyisobutylene.

Preferably the copolymerizable polymer comprises a high molecular weight polyalkyl group which is derived from a high molecular weight olefin. The high molecular weight olefins used in the preparation of the copolymers of the present invention are of sufficiently long chain length so that the resulting composition is soluble in and compatible with mineral oils, fuels and the like; and the alkylvinylidene isomer of the high molecular weight olefin comprises at least about 20% of the total olefin composition.

Such high molecular weight olefins are generally mixtures of molecules having different molecular weights and can have at least one branch per 6 carbon atoms along the chain, preferably at least one branch per 4 carbon atoms along the chain, and particularly preferred that there be about one branch per 2 carbon atoms along the chain. These branched chain olefins may conveniently comprise polyalkenes prepared by the polymerization of olefins of from about 3 to about 6 carbon atoms, and preferably from olefins of from about 3 to about 4 carbon atoms, and more preferably from propylene or isobutylene. The addition-polymerizable olefins employed are normally 1-olefins. The branch may be of from about 1 to about 4 carbon atoms, more usually of from about 1 to about 2 carbon atoms and preferably methyl.

The preferred alkylvinylidene isomer comprises a methyl- or ethylvinylidene isomer, more preferably the methylvinylidene isomer.

The especially preferred high molecular weight olefins used to prepare the copolymers of the present invention are polyisobutenes which comprise at least about 20% of the more reactive methylvinylidene isomer, preferably at least about 50% and more preferably at least about 70%. Suitable polyisobutenes include those prepared using $BF_3$ catalysis. The preparation of such polyisobutenes in which the methylvinylidene isomer comprises a high percentage of the total composition is described in U.S. Pat. Nos. 4,152,499 and 4,605,808.

Preparation of Copolymer (ii)

As noted above, copolymer (ii) of the present invention is prepared by reacting an olefin and an unsaturated acidic reactant in the presence of a free radical initiator. The process of the preparation of copolymer (ii) is described in Harrison, U.S. Pat. No. 5,112,507, which is herein incorporated by reference in its entirety.

The reaction may be conducted at a temperature of about −30° C. to about 210° C., preferably from about 40° C. to about 160° C. The degree of polymerization is inversely proportional to temperature. Accordingly, for the preferred high molecular weight copolymers, it is advantageous to employ lower reaction temperatures. For example, if the reaction is conducted at about 138° C., an average degree of polymerization of about 1.3 was obtained. However, if the reaction was conducted at a temperature of about 40° C., an average degree of polymerization of about 10.5 was obtained.

The reaction may be conducted neat, that is, both the high molecular weight olefin, acidic reactant and the free radical initiator are combined in the proper ratio, and then stirred at the reaction temperature.

Alternatively, the reaction may be conducted in a diluent. For example, the reactants may be combined in a solvent. Suitable solvents include those in which the reactants and free radical initiator are soluble and include acetone, tetrahydrofuran, chloroform, methylene chloride, dichloroethane, toluene, dioxane, chlorobenzene, xylenes, or the like. After the reaction is complete, volatile components may be stripped off. When a diluent is employed, it is preferably inert to the reactants and products formed and is generally used in an amount sufficient to ensure efficient mixing.

In the preparation of polyPIBSA, improved results are obtained by using PIBSA or polyPIBSA as a solvent for the reaction.

In general, the copolymerization can be initiated by any free radical initiator. Such initiators are well known in the art. However, the choice of free radical initiator may be influenced by the reaction temperature employed.

The preferred free-radical initiators are the peroxide-type polymerization initiators and the azo-type polymerization initiators. Radiation can also be used to initiate the reaction, if desired.

The peroxide-type free-radical initiator can be organic or inorganic, the organic having the general formula: $R_{12}OOR'_{13}$ where $R_{12}$ is any organic radical and $R'_{13}$ is selected from the group consisting of hydrogen and any organic radical. Both $R_{12}$ and $R'_{13}$ can be organic radicals, preferably hydrocarbon, aryl, and acyl radicals, carrying, if desired, substituents such as halogens, etc. Preferred peroxides include di-tert-butyl peroxide, dicumyl peroxide, and di-tert-amyl peroxide.

Examples of other suitable peroxides, which in no way are limiting, include benzoyl peroxide; lauroyl peroxide; other tertiary butyl peroxides; 2,4-dichlorobenzoyl peroxide; tertiary butyl hydroperoxide; cumene hydroperoxide; diacetyl peroxide; acetyl hydroperoxide; diethylperoxycarbonate; tertiary butyl perbenzoate; and the like.

The azo-type compounds, typified by alpha,alpha'-azobisisobutyronitrile, are also well-known free-radical promoting materials. These azo compounds can be defined as those having present in the molecule group —N=N wherein the balances are satisfied by organic radicals, at least one of which is preferably attached to a tertiary carbon. Other suitable azo compounds include, but are not limited to, p-bromobenzenediazonium fluoroborate; p-tolyldiazoaminobenzene; p-bromobenzenediazonium hydroxide; azomethane and phenyldiazonium halides. A suitable list of azo-type compounds can be found in U.S. Pat. No. 2,551,813, issued May 8, 1951 to Paul Pinkney.

The amount of initiator to employ, exclusive of radiation, of course, depends to a large extent on the particular initiator chosen, the high molecular olefin used and the reaction conditions. The initiator must, of course, be soluble in the reaction medium. The usual concentrations of initiator are between 0.001:1 and 0.2:1 moles of initiator per mole of acidic reactant, with preferred amounts between 0.005:1 and 0.10:1.

The polymerization temperature must be sufficiently high to break down the initiator to produce the desired free-radicals. For example, using benzoyl peroxide as the initiator, the reaction temperature can be between about 75° C. and about 90° C., preferably between about 80° C. and about 85° C. Higher and lower temperatures can be employed, a suitable broad range of temperatures being between about 20° C. and about 200° C., with preferred temperatures between about 50° C. and about 150° C.

The reaction pressure should be sufficient to maintain the solvent in the liquid phase. Pressures can therefore vary between about atmospheric and 100 psig or higher, but the preferred pressure is atmospheric.

The reaction time is usually sufficient to result in the substantially complete conversion of the acidic reactant and high molecular weight olefin to copolymer. The reaction time is suitably between one and 24 hours, with preferred reaction times between 2 and 10 hours.

As noted above, the subject reaction is a solution-type polymerization reaction. The high molecular weight olefin, acidic reactant, solvent and initiator can be brought together in any suitable manner. The important factors are intimate contact of the high molecular weight olefin and acidic reactant in the presence of a free-radical producing material. The reaction, for example, can be conducted in a batch system where the high molecular weight olefin is added all initially to a mixture of acidic reactant, initiator and solvent or the high molecular weight olefin can be added intermittently or continuously to the reactor. Alternatively, the reactants may be combined in other orders; for example, acidic reactant and initiator may be added to high molecular weight olefin in the reactor. In another manner, the components in the reaction mixture can be added continuously to a stirred reactor with continuous removal of a portion of the product to a recovery train or to other reactors in series. In yet another manner, the reaction may be carried out in a batch process, wherein the high molecular weight olefin is added initially to the reactor, and then the acidic reactant and the initiator are added gradually over time. The reaction can also suitably take place in a coil-type reactor where the components are added at one or more points along the coil.

Copolymer (iii)

In one embodiment, copolymer reactant (iii) is obtained by a copolymer obtained by (a) reacting compound (i)(a) with compound (i)(b) or (i)(c) in a non-free radical catalyzed reaction in the presence of copolymer (i) or copolymer (ii) or both; or by (b) contacting copolymer (i) or copolymer (ii) or both with the non-free radical catalyzed reaction product of compound (i)(a) and compound (i)(b) or (i)(c).
Preparation of Copolymer (iii)

A process for the preparation of copolymer (iii) is described, for example, in Harrison, et al., U.S. Pat. No. 6,451,920, which is herein incorporated by reference in its entirety.

In process step (a) above, any unreacted olefin, generally the more hindered olefins, i.e., the beta-vinylidene, that do not react readily with the monoethylenically unsaturated $C_3$-$C_{28}$ monocarboxylic acid or ester thereof, or $C_4$-$C_{28}$ dicarboxylic acid or an anhydride or ester thereof, under free radical conditions, are reacted with monoethylenically unsaturated $C_3$-$C_{28}$ monocarboxylic acid or ester thereof, or $C_4$-$C_{28}$ dicarboxylic acid or an anhydride or ester thereof, under thermal conditions, i.e., at temperatures of from about 180° C. to about 280° C. These conditions are similar to those used for preparing thermal process PIBSA. Optionally, this reaction takes place in the presence of a strong acid, such as sulfonic acid. See for example U.S. Pat. No. 6,156,850.

Optionally, a solvent may be used to dissolve the reactants. The reaction solvent must be one which dissolves both the acidic reactant and the high molecular weight olefin. It is necessary to dissolve the acidic reactant and high molecular weight olefin so as to bring them into intimate contact in the solution polymerization reaction. It has been found that the solvent must also be one in which the resultant copolymers are soluble.

Suitable solvents include liquid saturated or aromatic hydrocarbons having from about 6 to about 20 carbon atoms; ketones having from about 3 to about 5 carbon atoms; and liquid saturated aliphatic dihalogenated hydrocarbons having from about 1 to about 5 carbon atoms per molecule, preferably from about 1 to about 3 carbon atoms per molecule. By "liquid" is meant liquid under the conditions of polymerization. In the dihalogenated hydrocarbons, the halogens are preferably on adjacent carbon atoms. By "halogen" is meant F, Cl and Br. The amount of solvent must be such that it can dissolve the acidic reactant and high molecular weight olefin in addition to the resulting copolymers. The volume ratio of solvent to high molecular weight olefin is suitably between 1:1 and 100:1 and is preferably between 1.5:1 and 4:1.

Suitable solvents include the ketones having from about 3 to about 6 carbon atoms and the saturated dichlorinated hydrocarbons having from about 1 to about 5, more preferably from about 1 to about 3, carbon atoms.

Examples of suitable solvents include, but are not limited to:
1. ketones, such as: acetone; methylethylketone; diethylketone; and methylisobutylketone;
2. aromatic hydrocarbons, such as: benzene; xylene; and toluene;
3. saturated dihalogenated hydrocarbons, such as: dichloromethane; dibromomethane; 1-bromo-2-chloroethane; 1,1-dibromoethane; 1,1-dichloroethane; 1,2-dichloroethane; 1,3-dibromopropane; 1,2-dibromopropane; 1,2-dibromo-2-methylpropane; 1,2-dichloropropane; 1,1-dichloropropane; 1,3-dichloropropane; 1-bromo-2-chloropropane; 1,2-dichlorobutane; 1,5-dibromopentane; and 1,5-dichloropentane; or
4. mixtures of the above, such as: benzenemethylethylketone.

The copolymer is conveniently separated from solvent and any unreacted acidic reactant by conventional procedures such as phase separation, solvent distillation, precipitation and the like. If desired, dispersing agents and/or co-solvents may be used during the reaction.

The polyisobutenyl succinic anhydride (PIBSA), which may be directly added to copolymer reactant (i) or (ii), is generally prepared by a number of well-known processes including the method disclosed within. For example, there is a well-known thermal process (see, e.g., U.S. Pat. No. 3,361,673), an equally well-known chlorination process (see, e.g., U.S. Pat. No. 3,172,892), a combination of the thermal and chlorination processes (see, e.g., U.S. Pat. No. 3,912,764), catalytic strong acid processes (see, e.g., U.S. Pat. Nos. 3,819,660 and 6,156,850), and free radical processes (see, e.g., U.S. Pat. Nos. 5,286,799 and 5,319,030). Such compositions include one-to-one monomeric adducts (see, e.g., U.S. Pat. Nos. 3,219,666 and 3,381,022), as well as high succinic ratio products, adducts having alkenyl-derived substituents adducted with at least 1.3 succinic groups per alkenyl-derived substituent (see, e.g., U.S. Pat. No. 4,234,435).

Polyalkylene succinic anhydrides also can be produced thermally also from high methylvinylidene polybutene as disclosed in U.S. Pat. No. 4,152,499. This process is further discussed in U.S. Pat. No. 5,241,003 for the case where the succinic ratio is less than 1.3 and in European Application No. 0 355 895 for the case where the succinic ratio is greater than 1.3. European Applications Nos. 0 602 863 and 0 587 381, and U.S. Pat. No. 5,523,417 disclose a procedure for washing out the polymaleic anhydride resin from polyalkylene succinic anhydride prepared from high methylvinylidene polybutene. A polyalkylene succinic anhydride with a succinic ratio of 1.0 is disclosed. One advantage of polyalkylene succinic anhydride from high methylvinylidene polybutene is that it can be prepared essentially free of chlorine. U.S. Pat. No. 4,234,435 teaches a preferred polyalkene-derived substituent group with a number average ($M_n$) in the range of from about 1500 to about 3200. For polybutenes, an especially preferred number average ($M_n$) range is from about 1700 to about 2400. This patent also teaches that the succinimides must have a succinic ratio of at least 1.3. That is, there should be at least 1.3 succinic groups per equivalent weight of polyalkene-derived substituent group. Most preferably, the succinic ratio should be from 1.5 to 2.5.

Other suitable alkenyl succinic anhydrides includes those described in U.S. Pat. No. 6,030,930. Typical alkenyl used in the preparation are ethylene and 1-butene copolymers.

(B) The Ether Compounds

In one embodiment of the present invention, the copolymer is further reacted with an ether compound capable of linking two succinimide groups. Suitable ether compounds include, but are not limited to, the following:

Polyether Polyamines

Examples of suitable polyetheramines include compounds having the structure of formula 7:

Formula 7

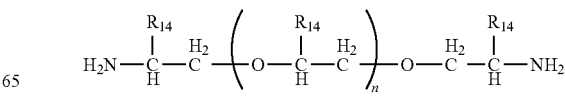

wherein $R_{14}$ is independently hydrogen or a hydrocarbyl group having from about 1 to about 4 carbons, and n is the degree of polymerization. Generally the polyether polyamines suitable for use in the present invention will contain at least about one ether unit, preferably from about 5 to about 100, more preferably from about 10 to about 50, and even more preferably from about 15 to about 25 ether units.

The polyether polyamines can be based on polymers derived from $C_2$-$C_6$ epoxides such as ethylene oxide, propylene oxide, and butylene oxide. Examples of polyether polyamines are sold under the Jeffamine® brand and are commercially available from Hunstman Corporation located in Houston, Tex.

Other examples of suitable polyetheramines include polyoxytetramethylene polyamine compounds having the structure of formula 8:

Formula 8

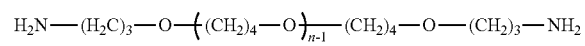

wherein n is the degree of polymerization (i.e., number of monomer ether units).

Polyether Amine Derivatives

Furthermore, the copolymer reactant may be reacted with a polyether amino alcohol or amino thiol.

Polyether Amino Alcohol

Typically, amino alcohols may be formed when the alcohol end groups of a compound are not completely converted to amines during reactions, such as reductive amination. Also, one may initiate a polymer chain (i.e. grow propylene or ethylene oxide) from an amino group and therefore have an amino on one end of the polymer chain (i.e. initiator) and an alcohol terminus, or an amine internally in the molecule with alcohol termini.

Examples of suitable polyetheramino alcohols include compounds having the following structure of formula 9:

Formula 9

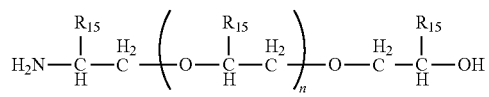

wherein $R_{15}$ is independently a hydrogen or hydrocarbyl group, having about 1 to about 4 carbons, and n is the degree of polymerization. Generally, the polyether amino alcohols, suitable for use in the present invention will contain at least about one ether unit, preferably from about 5 to about 100, more preferably from about 10 to about 50, and even more preferably from about 15 to about 25 ether units.

Other examples of suitable polyetheramino alcohols include polyoxytetramethyleneamino alcohol compounds having the structure of formula 10:

Formula 10

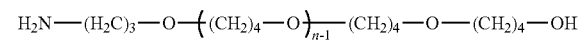

wherein n is the degree of polymerization.

Polyether Amino Thiol

Examples of suitable polyetheramino thiols include compounds having the structure of formula 11:

Formula 11

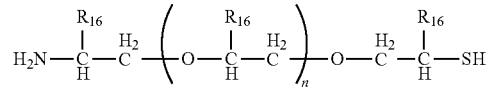

wherein $R_{16}$ is independently a hydrogen or hydrocarbyl group, having from about 1 to about 4 carbons and n is the degree of polymerization.

Other examples of suitable polyetheramino thiols include polyoxytetramethyleneamino thiol having the structure of formula 12:

Formula 12

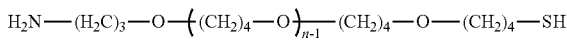

wherein n is the degree of polymerization.

Generally, the polyetheramino thiols suitable for use in the present invention will contain at least about one ether unit, preferably from about 5 to about 100, more preferably from about 10 to about 50, and even more preferably from about 15 to about 25 ether units.

Ether Polyamines

Ether Diamines

In yet another embodiment of the present invention, the copolymer may be reacted with ether diamines. Suitable diamines are reacted with the copolymer, such as decyloxypropyl-1,3-diaminopropane, isodecyloxypropyl-1,3-diaminopropane, isododecyloxypropyl-1,3-diaminopropane, dodecyl/tetradecyloxypropyl-1,3-diaminopropane, isotridecyloxypropyl-1,3-diaminopropane, tetradecyloxypropy-1,3-diaminopropane.

Polyether Polyol

In yet another embodiment of the present invention, the copolymer may be reacted with a polyether containing at least two hydroxyl end groups to form an ester. The polyether polyols have the structure of formula 13:

Formula 13

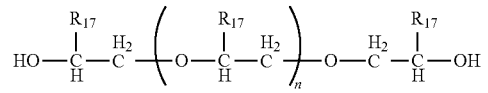

wherein $R_{17}$ is independently a hydrogen or hydrocarbyl group, having from about 1 to about 4 carbons, and n is the degree of polymerization.

Other examples of suitable polyether polyols include polyoxytetramethylene polyol compounds, such as those referred to as Terathane® which may be purchased from DuPont Corporation, Wilmington, Del., having the structure of formula 14:

Formula 14

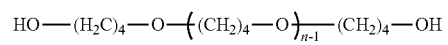

wherein n is the degree of polymerization.

Suitable polyether polyols include, but are not limited to, the following: polyoxyethylene glycol, polyoxypropylene glycol, polyoxybutylene glycol, and polyoxytetramethylene glycol.

The number average molecular weight of the presently employed polyether polyol will generally range from about 150 to about 5000, preferably from about 500 to about 2000.

Generally, the polyether compounds suitable for use in the present invention will contain at least one ether unit preferably from about 5 to about 100, more preferably from about 10 to about 50, and even more preferred from about 15 to about 25 ether units.

Generally, the polyether compounds suitable for use in the present invention may be derived from only one ether type or a mixture of ether types, such as poly(oxyethylene-co-oxypropylene) diamine. The mixture of ether units may be block, random, or alternating copolymers. The presently employed ether compounds are capable of reacting with at least two carboxylic acid groups or anhydride derivatives thereof.

Generally, the copolymer may be reacted with a mixture of polyether polyamines, polyether amino alcohols, polyether amino thiols, polyether polyols, or ether diamines to form a mixture of imides, amides and esters.

(C) Amino Aromatic Reactant

In addition to the ether compound (i.e. polyether polyamine, polyether polyamine derivative, polyether polyol, ether diamines and ether triamine) above, the copolymer is also reacted with at least one amino aromatic selected from the group consisting of (a) N-arylphenylenediamine, (b) aminocarbazole, (c) amino-indazolinone, (d) aminomercaptotriazole, (e) aminoperimidine; and (f) aryloxyphenylene amine.

Preferred amino aromatic compounds are described as follows:

(a) an N-arylphenylenediamine represented by formula 15:

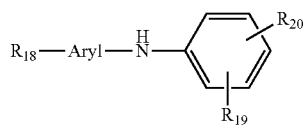

Formula 15 in which $R_{18}$ is H, —NHaryl, —NHalkaryl, or a branched or straight chain radical having from about 4 to about 24 carbon atoms that can be alkyl, alkenyl, alkoxyl, aralkyl or alkaryl; $R_{19}$ is —NH$_2$, —(NH(CH$_2$)—$_n$)—$_m$ NH$_2$, —NHalkyl, —NHaralkyl, —CH$_2$-aryl-NH$_2$, in which n and m each have a value from about 1 to about 10; and $R_{20}$ is hydrogen, alkyl, alkenyl, alkoxyl, aralkyl, or alkaryl, having from about 4 to about 24 carbon atoms. Particularly preferred N-arylphenylenediamines are N-phenylphenylenediamines (NPPDA), for example, N-phenyl-1,4-phenylenediamine, N-phenyl-1,3-phenylenediamine, and N-phenyl-1,2-phenylenediamine and N-naphthyl-1, 4-phenylenediamine. Other polyamines of NPPDA may also be included, such as N-aminopropyl-N'-phenylphenylenediamine.

(b) aminocarbazole represented by formula 16:

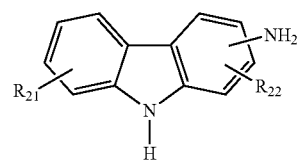

Formula 16 in which $R_{21}$ and $R_{22}$ each independently represent hydrogen or an alkyl or alkenyl radical having from about 1 to about 14 carbon atoms, (c) an amino-indazolinone represented by formula 17:

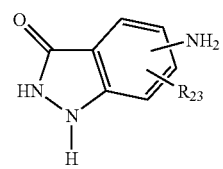

Formula 17 in which $R_{23}$ is hydrogen or an alkyl radical having from about 1 to about 14 carbon atoms; and (d) an aminomercaptotriazole represented by formula 18:

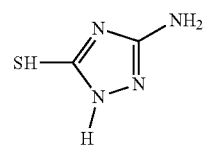

Formula 18

(e) an aminoperimidine represented by the formula 19:

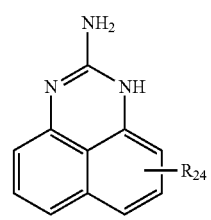

Formula 19 in which $R_{24}$ represents hydrogen or an alkyl radical having from about 1 to about 14 carbon atoms; and (f) an aryloxyphenyleneamine represented by formula 20:

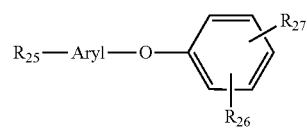

Formula 20 in which $R_{25}$ is H, —NHaryl, —NHalkaryl, or ranched or straight chain radical having from about 4 to about 24 carbon atoms that can be alkyl, alkenyl, alkoxyl, aralkyl or alkaryl; $R_{26}$ is —NH$_2$, —(NH(CH$_2$)—$_n$)—$_m$ NH$_2$, —NHalkyl, or —NHaralkyl, in which n and m each have a value from about 1 to about 10; and R$_{27}$ is hydrogen, alkyl, alkenyl, alkoxyl, aralkyl, or alkaryl, having from about 4 to about 24 carbon atoms. A particularly preferred aryloxyphenyleneamine is 4-phenoxyaniline.

Method of Making the Lubricating Oil Additive Composition

The lubricating oil additive composition is prepared by a process comprising charging the reactant copolymer (e.g., at least one of copolymers (i), (ii) and (iii) as described herein) in a reactor, optionally under a nitrogen purge, and heating at a temperature of from about 80° C. to about 170° C. Optionally, diluent oil may be charged optionally under a nitrogen purge in the same reactor, thereby producing a diluted copolymer reactant. The amount of diluent oil in the diluted copolymer is up to about 80 wt. %, more preferred from about 20 to about 60 wt. %, and most preferred from about 30 to about 50 wt. %. Both an amino aromatic amine and an ether polyamine, polyetheramine, polyetheramine derivative and/or polyether polyol are charged, optionally under a nitrogen purge, to the reactor. This mixture is heated under a nitrogen purge to a temperature in range from about 130° C. to about 200° C. Optionally, a vacuum is applied to the mixture for about 0.5 to about 2.0 hours to remove excess water.

The lubricating oil additive composition can also be made using a process comprising simultaneously charging all the reactants (reactant copolymer (i), (ii), or (iii); the amino aromatic amine; and the ether compound which consists of at least one of a polyether polyamine, polyether amino alcohol, polyetheramino thiol, ether polyamine and polyether polyol) at the desired ratios into the reactor. One or more of the reactants can be charged at an elevated temperature to facilitate mixing and reaction. A static mixer can be used to facilitate mixing of the reactants as they are being charged to the reactor. The reaction is carried out for about 0.5 to about 2 hours at a temperature from about 130° C. to about 200° C. Optionally a vacuum is applied to the reaction mixture during the reaction period.

Preferably, the ratio of polyetheramine, polyetheramine derivative and/or polyetherpolyol to monoethylenically unsaturated C$_3$-C$_{28}$ monocarboxylic acid or ester or C$_4$-C$_{28}$ dicarboxylic acid, anhydride or ester is 0.45 to 0.05; more preferred the ratio is 0.40 to 0.1; even more preferred, the ratio is 0.35 to 0.20; most preferred, the ratio is 0.33.

Preferably, the ratio of amino aromatic compound to monoethylenically unsaturated C$_3$-C$_{28}$ monocarboxylic acid or ester thereof, or C$_4$-C$_{28}$ dicarboxylic acid, anhydride or ester is 0.95 to 0.10; more preferred, the ratio is 0.40 to 0.20; even more preferred, the ratio is 0.35 to 0.25; most preferred, the ratio is 0.33.

In one embodiment of the invention, the non-free radical catalyzed reaction product of compound (i)(a) and compound (i)(b) or (i)(c), which is contacted with either copolymer (i) or copolymer (ii) or both, may be contacted in the presence of component (C) (i.e. the aromatic amine) prior to the addition of component (B) (i.e. the ether compound).

In one embodiment, the dispersant is a polysuccinimide. In one embodiment, the polysuccinimide dispersant is a succinimide dispersant derived from terpolymer PIBSA. In one embodiment, the polysuccinimide dispersant is a polysuccinimide dispersant derived from Terpolymer PIBSA, N-phenylenediamine and a polyether amine.

A. The Oil of Lubricating Viscosity

The neutral oil may be selected from Group I base stock, Group II base stock, Group III base stock, Group IV or poly-alpha-olefins (PAO), Group V, or base oil blends thereof. The base stock or base stock blend preferably has a saturate content of at least 65%, more preferably at least 75%; a sulfur content of less than 1%, preferably less than 0.6%, by weight; and a viscosity index of at least 85, preferably at least 100. These base stocks can be defined as follows:

Group I: base stocks containing less than 90% saturates and/or greater than 0.03% sulfur and having a viscosity index greater than or equal to 80 and less than 120 using test methods specified in Table 1 of the American Petroleum Institute (API) publication "Engine Oil Licensing and Certification Sheet" Industry Services Department, 14th Ed., December 1996, Addendum I, December 1998;

Group II: base stocks containing greater than or equal to 90% saturates and/or greater than 0.03% sulfur and having a viscosity index greater than or equal to 80 and less than 120 using test methods specified in Table 1 referenced above;

Group III: base stocks which are less than or equal to 0.03% sulfur, greater than or equal to 90% saturates, and greater than or equal to 120 using test methods specified in Table 1 referenced above.

Group IV: base stocks which comprise PAO's.

Group V: base stocks include all other base stocks not included in Group I, II, III, or IV.

For these definitions, saturates level can be determined by ASTM D 2007, the viscosity index can be determined by ASTM D 2270; and sulfur content by any one of ASTM D 2622, ASTM D 4294, ASTM D 4927, or ASTM D 3120.

B. Biodiesel Fuel

The lubricating oil compositions disclosed herein generally comprise at least one biodiesel fuel. Any biodiesel fuel which can be used to power a diesel-engine in its unaltered form can be used herein. Some non-limiting examples of biodiesel fuels are disclosed in the book by Gerhard Knothe and Jon Van Gerpen, "*The Biodiesel Handbook*," AOCS Publishing, (2005), which is incorporated herein by reference.

In some embodiments, the biodiesel fuel comprises one or more mono-alkyl esters of long chain fatty acids derived from a natural oil such as vegetable oils or animal fats. In other embodiments, the biodiesel fuel comprises one or more of methyl esters of long chain fatty acids. In further embodiments, the number of carbon atoms in the long chain fatty acids is from about 10 to about 30, from about 12 to about 30, from about 14 to about 26, or from about 16 to about 22. In further embodiments, the long chain fatty acid comprises palmitic acid (C16), oleic acid (C18:1), linoleic acid (C18:2) and other acids. In still further embodiments, the biodiesel fuel is derived from esterification or transesterification of corn oil, cashew oil, oat oil, lupine oil, kenaf oil, calendula oil, cotton oil, hemp oil, soybean oil, coffee oil, linseed oil, hazelnut oil, euphorbia oil, pumpkin seed oil, coriander oil, mustard seed oil, camelina oil, sesame oil, safflower oil, rice oil, tung oil, sunflower oil, cocoa oil, peanut oil, opium poppy oil, rapeseed oil, olive oil, castor bean oil, pecan nut oil, jojoba oil, jatropha oil, macadamia nut oil, Brazil nut oil, avocado oil, coconut oil, palm oil, Chinese tallow oil, or algae oil. In still further embodiments, the biodiesel fuel is chemically converted from natural oils or rapeseed, soya, jatropha or other virgin biomass, UCO (used-cooking oil), MSW (municipal solid waste) or from any viable fuel stock.

In certain embodiments, the biodiesel fuel disclosed herein comprises a biodiesel fuel that meets the EN 14214 standard, which is incorporated herein by reference. In other embodiments, the biodiesel fuels disclosed herein meet some of the EN 14214 specifications as shown in Table 1.

TABLE 1

| Property | Units | Lower Limit | Upper Limit | Test-Method |
|---|---|---|---|---|
| Ester content | % | 96.5 | | EN 14103d |
| Density at 15° C. | kg/m$^3$ | 860 | | EN ISO 3675 or EN ISO 12185. |
| Viscosity at 40° C. | mm$^2$/s | 3.5 | — | EN ISO 3104 |
| Flash point | ° C. | >101 | 900 | ISO CD 3679e |
| Sulfur content | mg/kg | — | 5.0 | — |
| Tar remnant (at 10% distillation remnant) | % | — | — | EN ISO 10370 |
| Cetane number | — | 51.0 | 10 | EN ISO 5165 |
| Sulfated ash content | % | — | 0.3 | ISO 3987 |

Generally, a pure biodiesel fuel that meets the ASTM D 6751-03 specifications has a B100 designation. The ASTM D 6751-03 is incorporated herein by reference. In some embodiments, a B100 biodiesel fuel can be mixed with a petroleum diesel fuel to form a biodiesel blend which may reduce emissions and improve engine performance. The biodiesel blend may have a designation "Bxx" wherein xx refers to the amount of the B100 biodiesel in vol. %, based on the total volume of the biodiesel blend. For example, "B6" refers to a biodiesel blend which comprises 6 vol. % of the B100 biodiesel fuel and 94 vol. % of the petroleum diesel fuel.

In some embodiments, the biodiesel fuel disclosed herein is a B100, B95, B90, B85, B80, B75, B70, B65, B60, B55, B50, B45, B40, B35, B30, B25, B20, B15, B10, B8, B6, B5, B4, B3, B2 or B1 biodiesel fuel. In other embodiments, a B100 biodiesel fuel is blended with one or more mineral diesels wherein the amount of the B100 biodiesel fuel is about 5 vol. %, about 6 vol. %, about 10 vol. %, about 15 vol. %, about 20 vol. %, about 25 vol. %, about 30 vol. %, about 35 vol. %, about 40 vol. %, about 45 vol. %, about 50 vol. %, about 55 vol. %, about 60 vol. %, about 65 vol. %, about 70 vol. %, about 75 vol. %, about 80 vol. %, about 85 vol. %, about 90 vol. %, or about 95 vol. %, based on the total volume of the biodiesel blend.

In some embodiments, the biodiesel fuel is used to power conventional diesel-engines designed to be powered by petroleum diesel fuels. In other embodiments, the biodiesel fuel is used to power modified diesel engines designed to be powered by natural oils or other biofuels.

The amount of the biodiesel fuel in the lubricating oil composition can be in any amount suitable to obtain desirable properties such as biodegradability and viscosity. In some embodiments, the amount of the biodiesel fuel in the lubricating oil composition is at least about 0.3 wt. %, is at least about 1 wt. %, at least about 2 wt. %, at least about 3 wt. %, at least about 4 wt. %, at least about 5 wt. %, at least about 10 wt. %, at least about 15 wt. %, at least about 20 wt. %, at least about 25 wt. %, at least about 30 wt. %, at least about 35 wt. %, at least about 40 wt. %, at least about 45 wt. %, or at least about 50 wt. %, based on the total weight of the lubricating oil composition.

C. Lubricating Oil Additives

In addition to the dispersant described herein, the lubricating oil composition can comprise additional lubricating oil additives.

Additional Lubricating Oil Additives

The lubricating oil compositions of the present disclosure may also contain other conventional additives that can impart or improve any desirable property of the lubricating oil composition in which these additives are dispersed or dissolved. Any additive known to a person of ordinary skill in the art may be used in the lubricating oil compositions disclosed herein. Some suitable additives have been described in Mortier et al., "Chemistry and Technology of Lubricants", 2nd Edition, London, Springer, (1996); and Leslie R. Rudnick, "Lubricant Additives: Chemistry and Applications", New York, Marcel Dekker (2003), both of which are incorporated herein by reference. For example, the lubricating oil compositions can be blended with additional antioxidants, anti-wear agents, detergents such as metal detergents, rust inhibitors, dehazing agents, demulsifying agents, metal deactivating agents, friction modifiers, pour point depressants, antifoaming agents, co-solvents, corrosion-inhibitors, ashless dispersants, multifunctional agents, dyes, extreme pressure agents and the like and mixtures thereof. A variety of the additives are known and commercially available. These additives, or their analogous compounds, can be employed for the preparation of the lubricating oil compositions of the disclosure by the usual blending procedures.

In the preparation of lubricating oil formulations it is common practice to introduce the additives in the form of 10 to 80 wt. % active ingredient concentrates in hydrocarbon oil, e.g. mineral lubricating oil, or other suitable solvent.

Usually these concentrates may be diluted with 3 to 100, e.g., 5 to 40, parts by weight of lubricating oil per part by weight of the additive package in forming finished lubricants, e.g. crankcase motor oils. The purpose of concentrates, of course, is to make the handling of the various materials less difficult and awkward as well as to facilitate solution or dispersion in the final blend.

D. Processes of Preparing Lubricating Oil Compositions

The lubricating oil compositions disclosed herein can be prepared by any method known to a person of ordinary skill in the art for making lubricating oils. In some embodiments, the base oil can be blended or mixed with a polysuccinimide dispersant. Optionally, one or more other additives in additional to the polysuccinimide dispersant can be added. The polysuccinimide dispersant and the optional additives may be added to the base oil individually or simultaneously. In some embodiments, the polysuccinimide dispersant and the optional additives are added to the base oil individually in one or more additions and the additions may be in any order. In other embodiments, the polysuccinimide dispersant and the additives are added to the base oil simultaneously, optionally in the form of an additive concentrate. In some embodiments, the solubilizing of the polysuccinimide dispersant or any solid additives in the base oil may be assisted by heating the mixture to a temperature from about 25° C. to about 200° C., from about 50° C. to about 150° C. or from about 75° C. to about 125° C.

Any mixing or dispersing equipment known to a person of ordinary skill in the art may be used for blending, mixing or solubilizing the ingredients. The blending, mixing or solubilizing may be carried out with a blender, an agitator, a disperser, a mixer (e.g., planetary mixers and double planetary mixers), a homogenizer (e.g., Gaulin homogenizers and Rannie homogenizers), a mill (e.g., colloid mill, ball mill and sand mill) or any other mixing or dispersing equipment known in the art.

E. Application of the Lubricating Oil Compositions

The lubricating oil composition disclosed herein may be suitable for use as motor oils (that is, engine oils or crankcase oils), in a diesel engine, particularly a diesel engine fueled at least in part with a biodiesel fuel.

The lubricating oil composition of the present invention may, also be used to prevent or inhibit viscosity increase of the lubricant, cool hot engine parts, keep the engine free of rust and deposits, and seal the rings and valves against leakage of combustion gases. The motor oil composition may comprise a base oil, a biodiesel fuel, and a polysuccinimide dispersant disclosed herein. Optionally, the motor oil composition may further comprises one or more other additives in addition to the polysuccinimide dispersant. In some embodiments, the motor oil composition further comprises a pour point depressant, a viscosity index improver, a detergent, additional dispersant(s), an anti-wear, an antioxidant, a friction modifier, a rust inhibitor, or a combination thereof.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The following examples are intended for illustrative purposes only and do not limit in any way the scope of the present invention.

Examples 1-3 and Comparative Examples 1-6 were top-treated with 7 wt. % B100 biodiesel fuel to simulate the effects of fuel dilution in biodiesel-fueled engines.

Baseline Formulation

A base-line formulation was prepared and used for assessing the performance of various dispersants in the CEC-L-109 bench test. The base-line formulation contained a mixture of calcium sulfonate and phenate detergents, zinc dialkyldithiophosphate, an antioxidant mixture, 0.3 wt. % of a polyacrylate pour point depressant (available from Evonik Rohmax), 5 ppm of a Si foam inhibitor and 6.8 wt. % non-dispersant type styrene isoprene copolymer viscosity index improver concentrate (available from Infineum under the designation "SV 201") in a base oil which was a mixture of a group III hydroisomerized base stock Nexbase® 3043 (18 wt. %, available from Neste) and a group III hydroisomerized base stock Nexbase® 3050 Group III base oil (82 wt. %, available from Neste). The composition had a phosphorus content of 0.074 wt. %, sulfur content of 0.191 wt. %, and sulfated ash of 0.77 wt %.

Polysuccinimide Dispersant of the Examples

The polysuccinimide dispersant of the following examples is a non-conventional polysuccinimide dispersant derived from Terpolymer PIBSA (2300 MW PIB), N-phenylenediamine and a polyether amine known as Huntsman Jeffamine® XTJ-501 (also called ED-900). For methods of making said polysuccinimide dispersant please refer to U.S. Pat. No. 7,745,541, the entirety of which is incorporated herein by reference.

Ethylene Carbonate Dispersant of the Examples

The EC-treated dispersant is a polybutene bis-succinimide derived from polybutenes having a molecular weight of about 2300. The EC-treated succinimide of this invention is described in U.S. Pat. Nos. 5,334,321 and 5,356,552.

Borated Bissuccinimide of the Examples

The borated bis-succinimide dispersant is derived from polybutenes having a molecular weight of about 1300.

Example 1

A lubricating oil composition was prepared consisting of the baseline formulation above with the addition of a polysuccinimide dispersant as described herein having 2.36 wt. % actives.

Example 2

A lubricating oil composition was prepared consisting of the baseline formulation above with the addition of a polysuccinimide dispersant as described herein having 3.54 wt. % actives.

Example 3

A lubricating oil composition was prepared consisting of the baseline formulation above with the addition of a polysuccinimide dispersant as described herein having 4.72 wt. % actives.

Comparative Example 1

A lubricating oil composition was prepared consisting of the baseline formulation above with the addition of a polysuccinimide dispersant as described herein having 1.8 wt. % actives.

Comparative Example 2

A lubricating oil composition was prepared consisting of the baseline formulation above with the addition of a polysuccinimide dispersant as described herein having 1.18 wt. % actives.

Comparative Example 3

A lubricating oil composition was prepared consisting of the baseline formulation above with the addition of an ethylene carbonate post-treated polyisobutenyl bissuccinimide having 2.28 wt. % actives.

Comparative Example 4

A lubricating oil composition was prepared consisting of the baseline formulation above with the addition of an ethylene carbonate post-treated polyisobutenyl bissuccinimide having 4.56 wt. % actives.

Comparative Example 5

A lubricating oil composition was prepared consisting of the baseline formulation above with the addition of a borated bissuccinimide having 2.52 wt. % actives.

Comparative Example 6

A lubricating oil composition was prepared consisting of the baseline formulation above with the addition of a borated bissuccinimide having 5.04 wt. % actives.

Oxidation Test for Engine Oils Operating in the Presence of Biodiesel Fuel: CEC L-109-14 Oxidation Test for Engine Oils Operating in the Presence of Biodiesel Fuel is a standard test method for evaluation of viscosity increase and oxidation level of an aged oil in the presence of biodiesel. The test is conducted at 150° C. by blowing 10 l/h air through the heated sample for 168 and/or 216 hrs in the presence of 7 wt % B100. Relative Viscosity increase versus time is measured. The test can be found at www.cectests.org.

Examples 1-3 and Comparative Examples 1-6 were evaluated in the Oxidation Test for Engine Oils Operating in the Presence of Biodiesel Fuel, CEC L-109-14, which is incorporated herein by reference. The test results are shown in Table 2 below. The test results indicate that examples 1 containing 2.36 wt. % actives of a polysuccinimide dispersant, example 2 containing 3.54 wt. % actives of a polysuccinimide dispersant, and example 3 containing 4.72 wt. % actives of a polysuccinimide dispersant displayed superior viscosity control performance. Comparative example 1 which contains 1.8 wt. % actives of a polysuccinimide dispersant and comparative example 2 which contains 1.18 wt. % actives of a polysuccinimide dispersant showed poorer viscosity control compared to examples 1-3. Moreover, comparative example 3 (ethylene carbonate post-treated polyisobutenyl succinimide (2.28 wt. % actives)) and comparative example 4 (ethylene carbonate post-treated polyisobutenyl succinimide (4.56 wt. % actives)) showed poorer viscosity control compared to almost equivalent treat of the polysuccinimide (see example 1 and 3 respectively. This same trend is seen with comparative example 5 and comparative example 6 as well.

TABLE 2

| Sample | Dispersant (actives) | Δ KV100 increase (%) |
|---|---|---|
| Example 1 | Polysuccinimide (2.36 wt. %) | 67.2 |
| Example 2 | Polysuccinimide (3.54 wt. %) | 17.70 |
| Example 3 | Polysuccinimide (4.72 wt. %) | 5.1 |
| Comparative Example 1 | Polysuccinimide (1.8 wt. %) | 886.80 |
| Comparative Example 2 | Polysuccinimide (1.18 wt. %) | 527.40 |
| Comparative Example 3 | ethylene carbonate post-treated polyisobutenyl succinimide (2.28 wt. %) | 777.4 |
| Comparative Example 4 | ethylene carbonate post-treated polyisobutenyl bissuccinimide (4.56 wt. %) | 28.43 |
| Comparative Example 5 | borated bissuccinimide (2.52 wt. %) | 707.5 |
| Comparative Example 6 | borated bissuccinimide (5.04 wt. %) | 509.6 |

While the invention has been described with respect to a limited number of embodiments, the specific features of one embodiment should not be attributed to other embodiments of the invention. No single embodiment is representative of all aspects of the invention. In some embodiments, the methods may include numerous steps not mentioned herein. In other embodiments, the methods do not include, or are substantially free of, steps not enumerated herein. Variations and modifications from the described embodiments exist. The appended claims intend to cover all such variations and modifications as falling within the scope of the invention.

All publications and patent applications mentioned in this specification are herein incorporated by reference to the same extent as if each individual publication or patent application was specifically and individually indicated to be incorporated by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A lubricating oil composition contaminated with at least about 0.3 wt % of a biodiesel fuel or a decomposition product thereof, based on the total weight of the lubricating oil composition, comprising a major amount of base oil of lubricating viscosity; and a polysuccinimide dispersant, said dispersant prepared by the process which comprises reacting
   (A) at least one of the following copolymers:
      (i) a copolymer obtained by free radical copolymerization of components comprising:
         (a) at least one monoethylenically unsaturated $C_3$-$C_{28}$ monocarboxylic acid or ester thereof, or $C_4$-$C_{28}$ dicarboxylic acid, anhydride or ester thereof;
         (b) at least one 1-olefin comprising about 2 to 40 carbon atoms or at least one polyolefin comprising about 4 to 360 carbon atoms and having a terminal copolymerizable group in the form of a vinyl, vinylidene or alkyl vinylidene group or mixtures thereof; and
         (c) at least one monoolefin compound which is copolymerizable with the monomers of (a) and (b) and is selected from the group consisting of:
            (1) an alkyl vinyl ether and an allyl alkyl ether where the alkyl group is hydroxyl, amino, dialkylamino or alkoxy substituted or is unsubstituted, and containing 1 to 40 carbon atoms;
            (2) an alkyl amine and an N-alkylamide of a monoethylenically unsaturated mono- or dicarboxylic acid of 3 to 10 carbon atoms wherein the alkyl substituent contains 1 to 40 carbon atoms;
            (3) a N-vinylcarboxamide of carboxylic acids of 1 to 8 carbon atoms;
            (4) a N-vinyl substituted nitrogen-containing heterocyclic compound; and
            (5) at least one 1-olefin comprising about 2 to 40 carbon atoms or at least one polyolefin comprising about 4 to about 360 carbon atoms and having a terminal copolymerizable group in the form of a vinyl, vinylidene or alkyl vinylidene group or mixtures thereof, provided that the olefin employed is not the same as the olefin employed in (i)(b);
      (ii) a copolymer obtained by reacting compound (i)(a) and compound (i)(b) in the presence of a free radical initiator;
      (iii) a copolymer obtained by (a) reacting compound (i)(a) with compound (i)(b) or (i)(c) in a non-free radical catalyzed reaction in the presence of copolymer (i) or copolymer (ii) or both; or by (b) contacting copolymer (i) or copolymer (ii) or both with the non-free radical catalyzed reaction product of compound (i)(a) and compound (i)(b) or (i)(c); with
   (B) at least one ether compound selected from the group consisting of an ether polyamine, a polyether polyamine, a polyether amino alcohol, a polyether amino thiol, and a polyether polyol; and (C) at least one aromatic amine; and wherein the amount of said dispersant present in the lubricating oil composition is at least about 2 wt. % actives, based on the total weight of the lubricating oil composition.

2. The lubricating oil composition of claim 1 further comprising at least one additive selected from the group consisting of antioxidants, antiwear agents, detergents, rust inhibitors, demulsifiers, friction modifiers, multi-functional additives, visosity index improvers, pour point depressants, foam inhibitors, metal deactivators, dispersants, corrosion inhibitors, lubricity improvers, thermal stability improvers, anti-haze additives, icing inhibitors, dyes, markers, static dissipaters, biocides and combinations thereof.

3. The lubricating oil composition of claim 1, wherein the sulfated ash content of the lubricating oil composition is at most about 2.0 wt. %, based on the total weight of the lubricating oil composition.

4. The lubricating oil composition of claim 1, wherein the biodiesel fuel comprises an alkyl ester of a long chain fatty acid.

5. The lubricating oil composition of claim 4, wherein the long chain fatty acid comprises from about 12 carbon atoms to about 30 carbon atoms.

6. The lubricating oil composition of claim 1, wherein the amount of the biodiesel fuel or decomposition products thereof is present in the lubricating oil composition at from about 0.3 wt. % to about 20 wt. %, based on the total weight of the lubricating oil composition.

7. The lubricating oil composition of claim 6, wherein the amount of the biodiesel fuel or decomposition products thereof is present in the lubricating oil composition at from about 1 wt. % to about 10 wt. %, based on the total weight of the lubricating oil composition.

8. The lubricating oil composition of claim 1, wherein the amount of the dispersant present in the lubricating oil composition is from about 2 to 10 wt. % actives, based on the total weight of the lubricating oil composition.

9. The lubricating oil composition of claim 1, wherein the amount of the dispersant present in the lubricating oil composition is from about 2 to 6 wt. % actives, based on the total weight of the lubricating oil composition.

10. The lubricating oil composition of claim 1, wherein the base oil has a kinematic viscosity from about 4 cSt to about 20 cSt at 100° C.

11. A method of lubricating a diesel engine fueled at least in part with a biodiesel fuel which comprises operating the engine with a lubricating oil composition contaminated with at least about 0.3 wt % of a biodiesel fuel or a decomposition product thereof, based on the total weight of the lubricating oil composition, wherein the lubricating oil composition comprises: comprising a major amount of base oil of lubricating viscosity; and a polysuccinimide dispersant, said dispersant prepared by the process which comprises reacting (A) at least one of the following copolymers:
 (i) a copolymer obtained by free radical copolymerization of components comprising:
  (a) at least one monoethylenically unsaturated $C_3$-$C_{28}$ monocarboxylic acid or ester thereof, or $C_4$-$C_{28}$ dicarboxylic acid, anhydride or ester thereof;
  (b) at least one 1-olefin comprising about 2 to 40 carbon atoms or at least one polyolefin comprising about 4 to 360 carbon atoms and having a terminal copolymerizable group in the form of a vinyl, vinylidene or alkyl vinylidene group or mixtures thereof; and
  (c) at least one monoolefin compound which is copolymerizable with the monomers of (a) and (b) and is selected from the group consisting of:
   (1) an alkyl vinyl ether and an allyl alkyl ether where the alkyl group is hydroxyl, amino, dialkylamino or alkoxy substituted or is unsubstituted, and containing 1 to 40 carbon atoms;
   (2) an alkyl amine and an N-alkylamide of a monoethylenically unsaturated mono- or dicarboxylic acid of 3 to 10 carbon atoms wherein the alkyl substituent contains 1 to 40 carbon atoms;
   (3) a N-vinylcarboxamide of carboxylic acids of 1 to 8 carbon atoms;
   (4) a N-vinyl substituted nitrogen-containing heterocyclic compound; and
   (5) at least one 1-olefin comprising about 2 to 40 carbon atoms or at least one polyolefin comprising about 4 to about 360 carbon atoms and having a terminal copolymerizable group in the form of a vinyl, vinylidene or alkyl vinylidene group or mixtures thereof, provided that the olefin employed is not the same as the olefin employed in (i)(b);
 (ii) a copolymer obtained by reacting compound (i)(a) and compound (i)(b) in the presence of a free radical initiator;
 (iii) a copolymer obtained by (a) reacting compound (i)(a) with compound (i)(b) or (i)(c) in a non-free radical catalyzed reaction in the presence of copolymer (i) or copolymer (ii) or both; or by (b) contacting copolymer (i) or copolymer (ii) or both with the non-free radical catalyzed reaction product of compound (i)(a) and compound (i)(b) or (i)(c); with (B) at least one ether compound selected from the group consisting of an ether polyamine, a polyether polyamine, a polyether amino alcohol, a polyether amino thiol, and a polyether polyol; and (C) at least one aromatic amine; and wherein the amount of said dispersant present in the lubricating oil composition is at least about 2 wt. % actives, based on the total weight of the lubricating oil composition.

12. The method of claim 11 further comprising at least one additive selected from the group consisting of antioxidants, antiwear agents, detergents, rust inhibitors, demulsifiers, friction modifiers, multi-functional additives, visosity index improvers, pour point depressants, foam inhibitors, metal deactivators, dispersants, corrosion inhibitors, lubricity improvers, thermal stability improvers, anti-haze additives, icing inhibitors, dyes, markers, static dissipaters, biocides and combinations thereof.

13. The method of claim 11, wherein the sulfated ash content of the lubricating oil composition is at most about 2.0 wt. %, based on the total weight of the lubricating oil composition.

14. The method of claim 11, wherein the biodiesel fuel comprises an alkyl ester of a long chain fatty acid.

15. The method of claim 14, wherein the long chain fatty acid comprises from about 12 carbon atoms to about 30 carbon atoms.

16. The method of claim 11, wherein the base oil has a kinematic viscosity from about 4 cSt to about 20 cSt at 100° C.

17. The method of claim 1, wherein the amount of the biodiesel fuel or decomposition products thereof is present in the lubricating oil composition at from about 0.3 wt. % to about 20 wt. %, based on the total weight of the lubricating oil composition.

18. The method of claim 1, wherein the amount of the dispersant present in the lubricating oil composition is from about 2 to 10 wt. % actives, based on the total weight of the lubricating oil composition.

19. A method for inhibiting viscosity increase in a diesel engine fueled at least in part with a biodiesel fuel which comprises operating the engine with a lubricating oil composition contaminated with at least about 0.3 wt % of a biodiesel fuel or a decomposition product thereof, based on the total weight of the lubricating oil composition, wherein the lubricating oil composition comprises: comprising a major amount of base oil of lubricating viscosity; and a polysuccinimide dispersant, said dispersant prepared by the process which comprises reacting
  (A) at least one of the following copolymers:
    (i) a copolymer obtained by free radical copolymerization of components comprising:
      (a) at least one monoethylenically unsaturated $C_3$-$C_{28}$ monocarboxylic acid or ester thereof, or $C_4$-$C_{28}$ dicarboxylic acid, anhydride or ester thereof;
      (b) at least one 1-olefin comprising about 2 to 40 carbon atoms or at least one polyolefin comprising about 4 to 360 carbon atoms and having a terminal copolymerizable group in the form of a vinyl, vinylidene or alkyl vinylidene group or mixtures thereof; and
      (c) at least one monoolefin compound which is copolymerizable with the monomers of (a) and (b) and is selected from the group consisting of:
        (1) an alkyl vinyl ether and an allyl alkyl ether where the alkyl group is hydroxyl, amino, dialkylamino or alkoxy substituted or is unsubstituted, and containing 1 to 40 carbon atoms;
        (2) an alkyl amine and an N-alkylamide of a monoethylenically unsaturated mono- or dicarboxylic acid of 3 to 10 carbon atoms wherein the alkyl substituent contains 1 to 40 carbon atoms;
        (3) a N-vinylcarboxamide of carboxylic acids of 1 to 8 carbon atoms;
        (4) a N-vinyl substituted nitrogen-containing heterocyclic compound; and
        (5) at least one 1-olefin comprising about 2 to 40 carbon atoms or at least one polyolefin comprising about 4 to about 360 carbon atoms and having a terminal copolymerizable group in the form of a vinyl, vinylidene or alkyl vinylidene group or mixtures thereof, provided that the olefin employed is not the same as the olefin employed in (i)(b);
    (ii) a copolymer obtained by reacting compound (i)(a) and compound (i)(b) in the presence of a free radical initiator;
    (iii) a copolymer obtained by (a) reacting compound (i)(a) with compound (i)(b) or (i)(c) in a non-free radical catalyzed reaction in the presence of copolymer (i) or copolymer (ii) or both; or by (b) contacting copolymer (i) or copolymer (ii) or both with the non-free radical catalyzed reaction product of compound (i)(a) and compound (i)(b) or (i)(c); with
  (B) at least one ether compound selected from the group consisting of an ether polyamine, a polyether polyamine, a polyether amino alcohol, a polyether amino thiol, and a polyether polyol; and
  (C) at least one aromatic amine; and
wherein the amount of said dispersant present in the lubricating oil composition is at least about 2 wt. % actives, based on the total weight of the lubricating oil composition.

20. The method of claim 19 further comprising at least one additive selected from the group consisting of antioxidants, antiwear agents, detergents, rust inhibitors, demulsifiers, friction modifiers, multi-functional additives, visosity index improvers, pour point depressants, foam inhibitors, metal deactivators, dispersants, corrosion inhibitors, lubricity improvers, thermal stability improvers, anti-haze additives, icing inhibitors, dyes, markers, static dissipaters, biocides and combinations thereof.

21. The method of claim 19, wherein the sulfated ash content of the lubricating oil composition is at most about 2.0 wt. %, based on the total weight of the lubricating oil composition.

22. The method of claim 19, wherein the biodiesel fuel comprises an alkyl ester of a long chain fatty acid.

23. The method claim 22, wherein the long chain fatty acid comprises from about 12 carbon atoms to about 30 carbon atoms.

24. The method of claim 19, wherein the base oil has a kinematic viscosity from about 4 cSt to about 20 cSt at 100° C.

25. The method of claim 19, wherein the amount of the biodiesel fuel or decomposition products thereof is present in the lubricating oil composition at from about 0.3 wt. % to about 20 wt. %, based on the total weight of the lubricating oil composition.

26. The method of claim 19, wherein the amount of the dispersant present in the lubricating oil composition is from about 2 to 10 wt. % actives, based on the total weight of the lubricating oil composition.

* * * * *